US011433598B2

(12) United States Patent
Coughlan et al.

(10) Patent No.: US 11,433,598 B2
(45) Date of Patent: Sep. 6, 2022

(54) BIOACTIVE GLASS/POLYMER COMPOSITE FILAMENT, AND METHODS OF MAKING

(71) Applicant: The University of Toledo, Toledo, OH (US)

(72) Inventors: Aisling Coughlan, Toledo, OH (US); Emily Krull, Toledo, OH (US)

(73) Assignee: The University of Toledo, Toledo, OH (US)

( * ) Notice: Subject to any disclaimer, the term of this patent is extended or adjusted under 35 U.S.C. 154(b) by 813 days.

(21) Appl. No.: 16/241,381

(22) Filed: Jan. 7, 2019

(65) Prior Publication Data
US 2019/0210273 A1   Jul. 11, 2019

Related U.S. Application Data

(60) Provisional application No. 62/614,773, filed on Jan. 8, 2018.

(51) Int. Cl.
| | |
|---|---|
| C03C 3/078 | (2006.01) |
| B29C 64/118 | (2017.01) |
| C03C 4/00 | (2006.01) |
| C08K 7/14 | (2006.01) |
| C08K 7/20 | (2006.01) |
| C08K 7/28 | (2006.01) |
| D02G 3/18 | (2006.01) |
| B29K 309/08 | (2006.01) |
| B33Y 70/00 | (2020.01) |
| B33Y 40/00 | (2020.01) |
| B33Y 10/00 | (2015.01) |
| C03C 3/089 | (2006.01) |
| C03C 12/00 | (2006.01) |
| C03C 13/00 | (2006.01) |

(52) U.S. Cl.
CPC ............ *B29C 64/118* (2017.08); *C03C 3/078* (2013.01); *C03C 4/0007* (2013.01); *C08K 7/14* (2013.01); *C08K 7/20* (2013.01); *C08K 7/28* (2013.01); *D02G 3/18* (2013.01); *B29K 2309/08* (2013.01); *B33Y 10/00* (2014.12); *B33Y 40/00* (2014.12); *B33Y 70/00* (2014.12); *C03C 3/089* (2013.01); *C03C 12/00* (2013.01); *C03C 13/00* (2013.01)

(58) Field of Classification Search
CPC ........... C03C 3/04; C03C 3/078; C03C 3/089; C03C 3/097
See application file for complete search history.

(56) References Cited

U.S. PATENT DOCUMENTS

| | | | |
|---|---|---|---|
| 2013/0295020 A1* | 11/2013 | Abraham | A61P 9/00 424/9.322 |
| 2014/0193499 A1* | 7/2014 | Da Fonte Ferreira | A61K 33/08 424/489 |
| 2017/0349876 A1* | 12/2017 | Deng | C03C 3/062 |
| 2020/0054784 A1* | 2/2020 | Martin | C03C 4/0014 |

FOREIGN PATENT DOCUMENTS

| | | | |
|---|---|---|---|
| CN | 102050580 A | * | 5/2011 |
| CN | 109020230 A | * | 12/2018 |

* cited by examiner

*Primary Examiner* — Hoa (Holly) Le
(74) *Attorney, Agent, or Firm* — MacMillan, Sobanski & Todd, LLC

(57) ABSTRACT

Bioactive glass compositions, composites of the bioactive glass compositions with polymers, and 3D printable filaments made from the same, along with methods of making and using the same, are described. In some embodiments, the compositions, composites, and filaments have antibacterial activity.

19 Claims, 31 Drawing Sheets
(17 of 31 Drawing Sheet(s) Filed in Color)

BIOACTIVE GLASS/POLYMER COMPOSITE FILAMENT, AND METHODS OF MAKING

RELATED APPLICATIONS

This application claims priority to U.S. Provisional Application No. 62/614,773 filed under 35 U.S.C. § 111(b) on Jan. 8, 2018, the disclosure of which is incorporated herein by reference in its entirety.

STATEMENT REGARDING FEDERALLY SPONSORED RESEARCH

This invention was made with no government support. The government has no rights in this invention.

BACKGROUND

A 3D printer is a device for three-dimensionally printing a material to have the a desired shape using X-, Y-, and Z-axis data of an object. The use of 3D printers is rapidly expanding. Fused deposition 3D printing uses a printer that controls the layer-by-layer deposition of a material onto a platform. As the material is built up, it forms an object. This process allows for rapid prototyping and development of parts, while simultaneously providing endless applications in a wide range of fields including medical and aerospace. Depending on the application, an appropriate material must be selected and fed into the printer. Materials for desktop fused deposition printing come as filamnets and are commonly made of polymers such polylactic acid (PLA) and acrylonitrile butadiene styrene (ABS). However, these materials are generally considered to have poor mechanical properties and can easily harbor harmful entities including, for example, viruses or bacteria. Therefore, there is a need in the art for new and improved 3D-printing filaments.

SUMMARY

Provided is a bioactive glass composition comprising one or more elemental former components comprising an element of the group consisting of: Si, Ge, and B; one or more modifier component comprising an element of the group consisting of: Ca, Na, Mg, Sr, Cl, Co, Fe, Ba, Mo, and Cr; and at least one additive component comprising Ag, Au, Zn, K, P, Cu, Se, Ga, Ti, or V, where the one or more elemental former components are present in a combined amount ranging from about 40 mol % to about 65 mol %, the one or more modifier components are present in a combined amount ranging from about 10 mol % to about 50 mol %, and the at least one additive component is present in an amount ranging from about 1 mol % to about 40 mol %. In certain embodiments, the elemental former component comprises an oxide, nitride, phosphate, carbonate, or carboxylate. In certain embodiments, the modifier component comprises an oxide, nitride, phosphate, carbonate, or carboxylate. In certain embodiments, the additive component comprises an oxide, nitride, phosphate, carbonate, or carboxylate.

In certain embodiments, the one or more modifier components are present in a combined amount of from about 35 mol % to about 50 mol %. In certain embodiments, the one or more additive components are present in an amount of at least 10 mol %. In certain embodiments, the additive component comprises Zn or Cu. In certain embodiments, the bioactive glass composition comprises a plurality of additive components, where the plurality of additive components comprises Zn and Cu. In certain embodiments, the bioactive glass composition comprises one or more additive components comprising Zn in a combined amount of up to about 30 mol %. In particular embodiments, the one or more additive components comprising Zn are present in a combined amount ranging from about 10 mol % to about 15 mol %.

In certain embodiments, the composition comprises an elemental former component comprising Si present in an amount of about 40 mol %, a modifier component comprising Na present in an amount of about 10 mol %, and an elemental former component comprising B present in an amount of about 10 mol %.

In certain embodiments, the bioactive glass composition comprises Si, Na, Sr, K, Mg, and Zn. In certain embodiments, the bioactive glass composition comprises $SiO_2$, $Na_2O$, SrO, and $K_2O$. In certain embodiments, the bioactive glass composition comprises about 45 mol % $SiO_2$, about 10 mol % SrO, about 10 mol % $Na_2O$, and about 5 mol % $K_2O$. In particular embodiments, the bioactive glass composition further comprises ZnO and MgO. In particular embodiments, the ZnO is present in an amount ranging from about 1 mol % to about 30 mol %. In particular embodiments, the ZnO is present in an amount ranging from about 10 mol % to about 15 mol %. In particular embodiments, the MgO is present in an amount ranging from about 1 mol % to about 30 mol %.

In certain embodiments, the bioactive glass composition comprises Si, Na, K, Mg, and Zn, and is free of Sr.

In certain embodiments, the bioactive glass composition comprises Si, Na, B, Cu, and Zn. In particular embodiments, the bioactive glass composition comprises an elemental former component comprising Si in an amount of about 40 mol %, a modifier component comprising Na in an amount of about 10 mol %, and an elemental former component comprising B in an amount of about 10 mol %. In particular embodiments, the bioactive glass composition comprises an additive component comprising Zn in an amount ranging from about 35 mol % to about 45 mol %. In particular embodiments, the bioactive glass composition comprises an additive component comprising Cu in an amount ranging from about 1 mol % to about 5 mol %. In particular embodiments, the bioactive glass composition comprises an additive component comprising Zn in an amount ranging from about 38 mol % to about 40 mol %, and an additive component comprising Cu in an amount ranging from about 1 mol % to about 2 mol %.

In certain embodiments, the bioactive glass composition is in a polymer filament. In particular embodiments, the polymer filament comprises polylactic acid (PLA), polyglycolide (PGA), acrylonitrile butadiene styrene (ABS), polypropylene (PP), polyethylene (PE), polyether ether ketone (PEEK), high impact polystyrene (HIPS), ethylene vinyl acetate (EVA), rubber, nylon, thermoplastic polyolefin (TPO), or a blend thereof.

In certain embodiments, the bioactive glass composition releases antibacterial ions.

In certain embodiments, the bioactive glass composition is formed through a melt quenching process from $SiO_2$, $Na_2O$, SrO, $K_2O$, MgO, and ZnO.

In certain embodiments, the bioactive glass composition is in the form of glass fibers or glass powders.

In certain embodiments, the bioactive glass composition further comprises an additive selected from the group consisting of coloring agents, plasticizers, antioxidants, thermal stabilizers, UV stabilizers, flame retardants, lubricants, antistatic agents, foaming agents, antifogging agents, nucleating agents, antiblocking agents, slip agents, and radio-opaque agents.

In certain embodiments, the bioactive glass composition is in a polymer filament. In particular embodiments, the polymer filament comprises polylactic acid (PLA), polyglycolide (PGA), acrylonitrile butadiene styrene (ABS), polypropylene (PP), polyethylene (PE), polyether ether ketone (PEEK), high impact polystyrene (HIPS), ethylene vinyl acetate (EVA), rubber, nylon, thermoplastic polyolefin (TPO), or blends thereof.

In certain embodiments, the bioactive glass composition comprises Zn in an amount of up to about 40 mol %. In particular embodiments, the Zn is present in an amount ranging from about 10 mol % to about 15 mol %.

In certain embodiments, the bioactive glass composition is in the form of glass fibers or glass powders. In certain embodiments, the bioactive glass composition further comprises an additive selected from the group consisting of coloring agents, plasticizers, antioxidants, thermal stabilizers, UV stabilizers, flame retardants, lubricants, antistatic agents, foaming agents, antifogging agents, nucleating agents, antiblocking agents, slip agents, or radio-opaque agents.

Further provided is a composite comprising a polymer having bioactive glass particles or fibers incorporated therein, wherein the bioactive glass particles or fibers comprise in part at least one of Ag, Au, Zn, K, P, Cu, Se, Ga, Ti, or V. In certain embodiments, the composite has a bioactive glass:polymer ratio of from about 1:10 to about 2:3 by weight. In certain embodiments, the composite releases Zn ions. In certain embodiments, the polymer comprises polylactic acid (PLA), polyglycolide (PGA), acrylonitrile butadiene styrene (ABS), polypropylene (PP), polyethylene (PE), polyether ether ketone (PEEK), high impact polystyrene (HIPS), ethylene vinyl acetate (EVA), rubber, nylon, thermoplastic polyolefin (TPO), or blends thereof. In certain embodiments, the bioactive glass particles or fibers comprise $SiO_2$, $Na_2O$, SrO, $K_2O$, MgO, and ZnO. In certain embodiments, the composite further comprises an additive selected from the group consisting of coloring agents, plasticizers, antioxidants, thermal stabilizers, UV stabilizers, flame retardants, lubricants, antistatic agents, foaming agents, antifogging agents, nucleating agents, antiblocking agents, slip agents, or radio-opaque agents. In certain embodiments, the composite releases ions and exhibits antibacterial properties. In certain embodiments, the composite is formed into packaging for food or medical devices, where the packaging has antibacterial activity.

Further provided is a filament for 3D printing comprising a polymeric material defining a surface and a cross section, and bioactive glass particles or fibers on the surface and in the cross section. In certain embodiments, the bioactive glass comprises at leaset one of Ag, Au, Zn, K, P, Cu, Se, Ga, Ti, or V. In certain embodiments, the filament releases Zn ions from the bioactive glass particles or fibers. In certain embodiments, the polymeric material comprises one or more polymers selected from the group consisting of: polylactic acid (PLA), polyglycolide (PGA), acrylonitrile butadiene styrene (ABS), polypropylene (PP), polyethylene (PE), polyether ether ketone (PEEK), high impact polystyrene (HIPS), ethylene vinyl acetate (EVA), rubber, nylon, thermoplastic polyolefin (TPO), and blends thereof. In certain embodiments, the filament has a bioactive glass:polymer ratio of from about 1:10 to about 2:3 by weight. In certain embodiments, the filament further comprises an additive selected from the group consisting of coloring agents, plasticizers, antioxidants, thermal stabilizers, UV stabilizers, flame retardants, lubricants, antistatic agents, foaming agents, antifogging agents, nucleating agents, antiblocking agents, slip agents, or radio-opaque agents.

Further provided is a method for making a 3D printable filament, the method comprising heating a mixture of a polymer and bioactive glass particles or fibers to form a composite, and extruding the composite to form a filament, where the filament releases ions from the bioactive glass particles or fibers. In certain embodiments, the released ions comprise silver, gold, zinc, potassium, phosphorus, copper, selenium, gallium, titanium, or vanadium. In certain embodiments, the method further comprises printing a 3D object with the 3D printable filament.

Further provided is a method of 3D printing, the method comprising printing a 3D object with a filament having antibacterial activity, where the filament comprises a bioactive glass composition on a surface and in a cross section of the filament.

Further provided is a kit for preparing a 3D printable filament, the kit comprising a first container housing a bioactive glass composition comprising particles or fibers and at least one of Ag, Au, Zn, K, P, Cu, Se, Ga, Ti, or V, and a second container housing a polymeric material.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 1C illustrates a cross section from the line A-A in FIG. 1B.

FIGS. 10B, 10D, 10F show the SEM images seen in FIGS. 10A, 10C, and 10E, respectively, using a backscatter detector. No phase separation is seen.

DETAILED DESCRIPTION

Figure 1A:
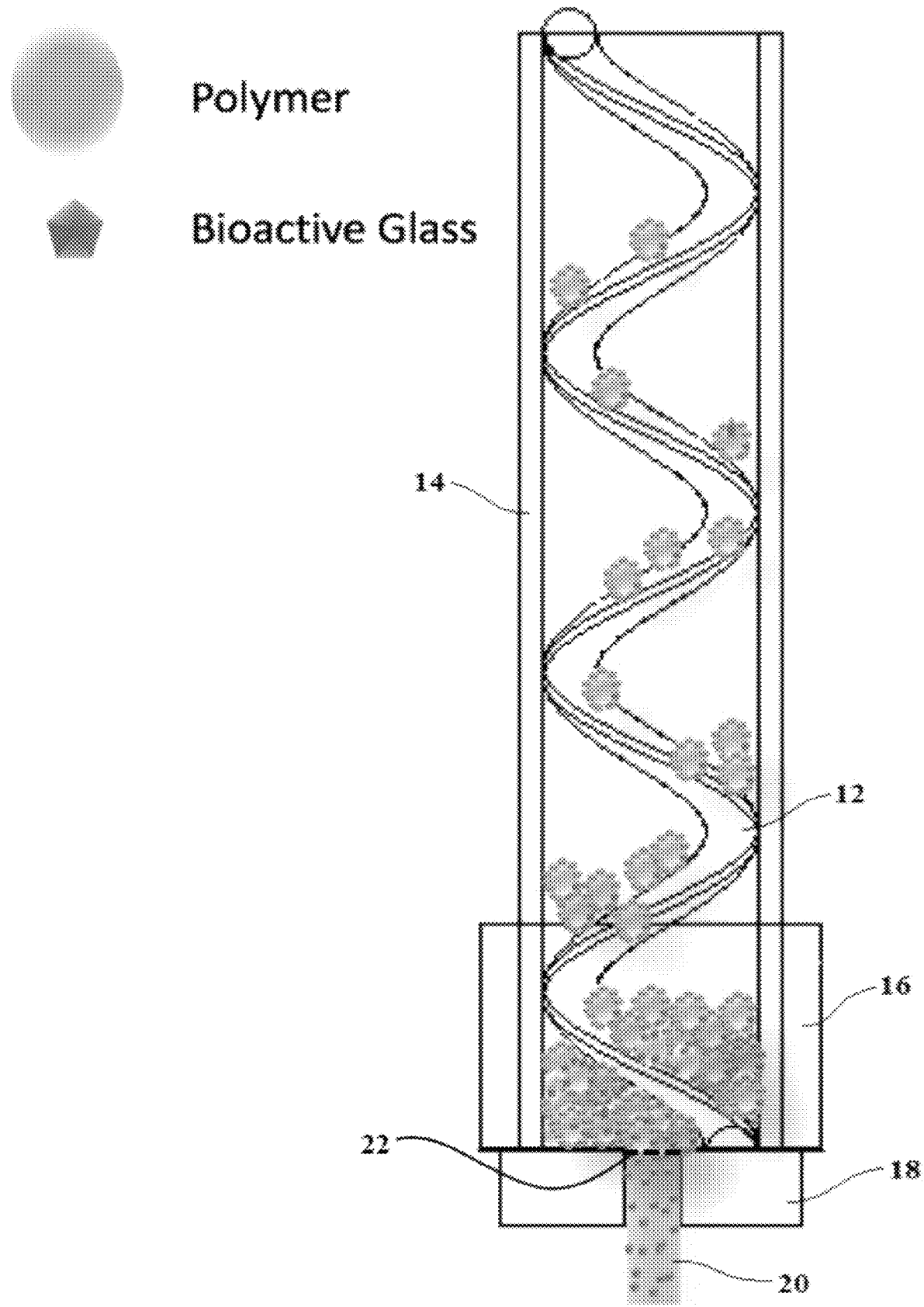
FIGS. 1A-1C: A process for a 3D printable filament using an extrusion device (FIG. 1A), and non-limiting example illustrations of a 3D printable filament from the side (FIG. 1B) and showing a cross section (FIG. 1C).

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Described herein is a bioactive glass composition, and a polymer composite including the bioactive glass composition, useable for the production of 3D printable filaments that can be used in traditional fused deposition 3D printers. In some embodiments, the bioactive glass, composite, and 3D printable filaments have antimicrobial properties due to the release of ions from the bioactive glass.

In general, the bioactive glass described herein is a composition that includes one or more elemental former components comprising Si, Ge, or B, one or more modifier components comprising Ca, Na, Mg, Sr, Cl, Co, Fe, Ba, Mo, or Cr, and also at least one additive component comprising Ag, Au, Zn, K, P, Cu, Se, Ga, Ti, or V for beneficial properties. The elemental former components are present in the composition in an amount up to about 65 mol %. However, it is understood that when the composition includes more than 60 mol % former, the bioactive glass may be less active. In some embodiments, the glass contains a Zn-containing additive component in an amount up to about 30 mol %. In one non-limiting example, the glass includes a Zn-containing additive component in an amount ranging from about 10 mol % to about 15 mol %. In other embodiments, the glass includes a Cu-containing additive component in an amount up to about 30 mol %. As demonstrated in the examples herein, the bioactive glass composition has antibacterial properties stemming from the release of ions.

Many other bioactive glass compositions are possible. In some embodiments, the bioactive glass composition in is free of Sr. For example, the bioactive glass composition may contain $SiO_2$, $Na_2CO_3$, $K_2CO_3$, MgO, and ZnO. In another non-limiting example, the bioactive glass composition includes $SiO_2$, $Na_2O$, $B_2O_3$, $Cu_2O$, and ZnO. In other embodiments, the bioactive glass composition is free of Zn. In such embodiments, a burst release of cytotoxic ions can result, which may be advantageous for applications such as sterilizing glassware.

The former components, modifier components, and additive components are suitable compounds for creating glass compositions. Non-limiting examples of such compounds are oxides, nitrides, phosphates, carbonates, and carboxylates. However, other types of compounds may be utilized to produce the same end result. Moreover, combinations of compound types may be employed. For example, both CaO and $CaCO_3$ may be used to add Ca to the bioactive glass composition.

By way of non-limiting example, the bioactive glass composition can be prepared from $SiO_2$, $Na_2CO_3$, $SrCO_3$, $K_2CO_3$, MgO, and ZnO through a melt quenching process. Melt quenching involves cooling the molten form of a material quickly to produce an amorphous solid. The amorphous solid is formed by the continuous hardening (i.e., continuous increase in viscosity) of the melt. To make the non-limiting example bioactive glass composition through melt quenching, the compounds $SiO_2$, $Na_2CO_3$, $SrCO_3$, $K_2CO_3$, MgO, and ZnO are ground to a fine powder and mixed thoroughly, for example where the $SiO_2$ is at a mole fraction of 0.45, the $Na_2CO_3$ is at a mole fraction of 0.1, the $SrCO_3$ is at a mole fraction of 0.1, the $K_2CO_3$ is at a mole fraction of 0.05, the MgO is at a mole fraction ranging from about 0.15 to about 0.25, and the ZnO is at a mole fraction ranging from about 0.05 to about 0.15.

The mixture is melted in a suitable furnace. The melt is then poured onto a suitable surface or medium, such as a container of water, or oil, or a plate for cooling. The container or medium is not particularly limited. The resulting glass particles can be ground, such as by using a planetary ball mill with a Yttrium stabilized zirconia grinding media, and sieved to the desired size. The resulting particles can be introduced into an extrusion device as described below to be incorporated into a composite with a polymeric material.

It is understood that although melt quenching is described for exemplary purposes, other methods, such as a sol gel process, could alternatively be employed to prepare the bioactive glass, and such methods and the resulting compositions are entirely encompassed within the scope of the present disclosure. In a non-limiting example sol-gel process, a metal-organic solution containing metal salt precursors is prepared and then reacted in the presence of an acid catalyst to produce a gel, which is then thermally treated (and optionally cooled) for drying, organic removal, and crystallization. Sol gel methods generally create uniform sized particles, whereas melt quench methods may involve sieving to a desired particle size.

Since the development of the first bioactive glass, Bioglass™ (45% $SiO_2$, 24.5% $Na_2O$, 24.4% CaO, and 6% $P_2O_5$) in 1969, modifications and expansions on the composition have been established to target specific biological responses. These responses are governed by the nature of the ions leached from the glass network as well as their concentrations, making it important to the functionality of the material to control the release of these ions while maintaining bioactivity. Because bone tissue scaffolding is one of the main areas of application for bioactive glasses, much of the current work being done in the art is the tailoring of the ion release to incite bone formation and healing. Such ion interactions can be controlled by the integration of specific elements, which can either behave as formers or modifiers, into the glass. Silica, a well-known glass former, positively affects the biological response as it has been reported to be linked to the collagen formation and calcification of developing bone. Furthermore, Si has been shown to increase cell proliferation and early stage cellular attachment of human mesenchymal stem cells in silicon rich hydroxyapatite graft material.

The addition of ionic modifiers, such as sodium (Na), decreases the energy in the system by causing a shift in the number of Si—O—Si bonds. With fewer Si—O—Si bonds present in the system, the glass network can be more readily broken down and is therefore correlated to a lower glass transition temperature and a higher release rate of the ions. Specifically, it is the presence of ions such as Na, which are exchanged for hydrogen ions in an aqueous environment, that initiates the formation of an apatite layer on bioactive glasses. It is this apatite layer formation that makes bioactive glasses particularly suited for bone tissue scaffolding, as it allows for bonding to native bone tissue.

Beyond allowing for apatite formation, network modifiers can be incorporated into the network to elicit other in vivo or in vitro responses. For example, ions such as magnesium ($Mg^{2+}$) and strontium ($Sr^{2+}$) are known to encourage bone growth via increased osteoblast proliferation and angiogenesis. More specifically, Mg plays an important role in stabilizing the structure of DNA and RNA, as well as acting as a critical mineral element in bone tissue. Moreover, it has also been documented that there is a decrease in crystal formation during heat treatments of glasses containing $Mg^{2+}$ and $K^+$, which helps maintain the glasses' integrity during scaffold production. $K^+$ ions contribute to the mineralization process and apatite formation, which is important for the material's ability to bond to bone and stimulate new bone formation.

Zinc ions ($Zn^{2+}$) inhibit bacterial cell functions at a concentration of $>6.5 \times 10^{-4}$ ppm. Unlike conventional antibiotics that are delivered systemically, bioactive glass degradation can release antibacterial $Zn^{2+}$ directly into the surrounding area. Furthermore, the inflammatory response commonly seen surrounding implantation sites can be reduced due to the anti-inflammatory effect of $Zn^{2+}$. Even regarding bone formation, Zn has proven important for healthy growth of bone tissue.

Although glasses can be formed with a multiplicity of beneficial ingredients, burst releases can create cytotoxic environments. This cytotoxicity often stems from the change in pH of the environment as a result of the leaching ions. It is known that ions with relatively large ionic radii lead to rapid leaching by expanding the network of the glasses and thereby decreasing the oxygen density, allowing for penetration of water molecules. Such large, charged atoms include Potassium ($K_+$) and Sodium ($Na^+$), both of which are desirable to incorporate for biological applications due their favorable effects in biological systems, especially in the context of the stimulation of bone formation and decreasing the chance of crystal formation.

In accordance with the present disclosure, in glass series where Zinc (in the form of the compound ZnO) is substituted for Magnesium (in the form of the compound MgO), which has a similar ionic radius, a retardation of leaching is independent of the bridging oxygen content of silica and phosphorous glass networks. Thus, while ZnO diminishes the reactivity of the glass, it still behaves as a network modifier. Because of the similar size of the ions, it is unlikely that it is a tighter packing of the network that slows the release rate of ions in a system where Zn is substituted for Mg.

A composite may be made between the bioactive glass composition and a polymer, to produce various articles and products such as, but not limited to, a filament for 3D printing. Such a 3D printing filament is composed of a polymer reinforced with the bioactive glass which not only provides functionality, but also increases the mechanical integrity of printed objects. The bioactive glass reinforces the filament, increasing its strength. The bioactive glass contributes biocompatibility and antibacterial activity to the resulting composites, filaments, and 3D printed objects.

In general, the polymeric aspect of a composite is produced from at least one polymer such as, but not limited to, polylactic acid (PLA), polyglycolide (PGA), acrylonitrile butadiene styrene (ABS), polypropylene (PP), polyethylene (PE), polyether ether ketone (PEEK), high impact polystyrene (HIPS), ethylene vinyl acetate (EVA), rubber, nylon, thermoplastic polyolefin (TPO), or blends thereof. However, other polymers are entirely possible and encompassed within the present disclosure. Optionally, the polymer may come from a renewable source, such as potato starch or corn starch, and may exhibit excellent biodegradability.

When the composite is in a form or shape conducive for 3D printing, it is referred to herein as a filament. By way of non-limiting example, an extrusion process can be used to produce the filament. Bioactive glass particles or fibers are incorporated into the filament in a way such that they are present both on the surface of the filament and in the cross section of the filament. In one non-limiting example process, the filament is prepared by extruding a mixture of the bioactive glass with the polymer using an extrusion device, such as the device illustrated in FIG. 1A. The mixture may be composed of glass and polymer at a bioactive glass:polymer ratio ranging from about 1:10 to about 2:3 by weight. The temperature and conditions for the extrusion may be different according to the type of polymer used. For example, when PLA is used, the extrusion conditions may include a melt temperature of about 210° C., and a feed temperature of about 45° C. The extrusion device manufactures the mixture into a filament by extrusion, although other methods of producing a 3D printable filament from a composite of polymer and the bioactive glass composition described herein are entirely encompassed within the present disclosure.

Referring now to FIG. 1A, an extrusion device 10 includes an auger 12 within a housing 14, a heater 16, and a nozzle 18. Polymer pellets and bioactive glass fibers or powders are introduced into the housing 14 of the extrusion device 10 and traverse the housing 14 in the direction of the nozzle 18 by mechanical turning of the auger 12 and/or by gravity. The auger 12 can be turned by hand using a crank or, in other embodiments, a motor can be used to drive the auger 12. Optionally, a hopper can be included to regulate the flow of material into the housing 14. The heater 16 is disposed around the housing 14 and configured to provide heat to an area within the housing 14 at a position near the nozzle 18. The heater 16 heats the polymer and bioactive glass while the auger 12 drives the polymer and bioactive glass together to form a composite, which is then extruded through the nozzle 18 to produce a filament 20 useful for 3D printing. A filter 22 is present where the composite is extruded through the nozzle 18. The diameter of the nozzle 18 may vary widely, and may be tailored for the desired application. In one non-limiting example, the diameter of the nozzle 18 is 2.85 mm.

Figure 1B:
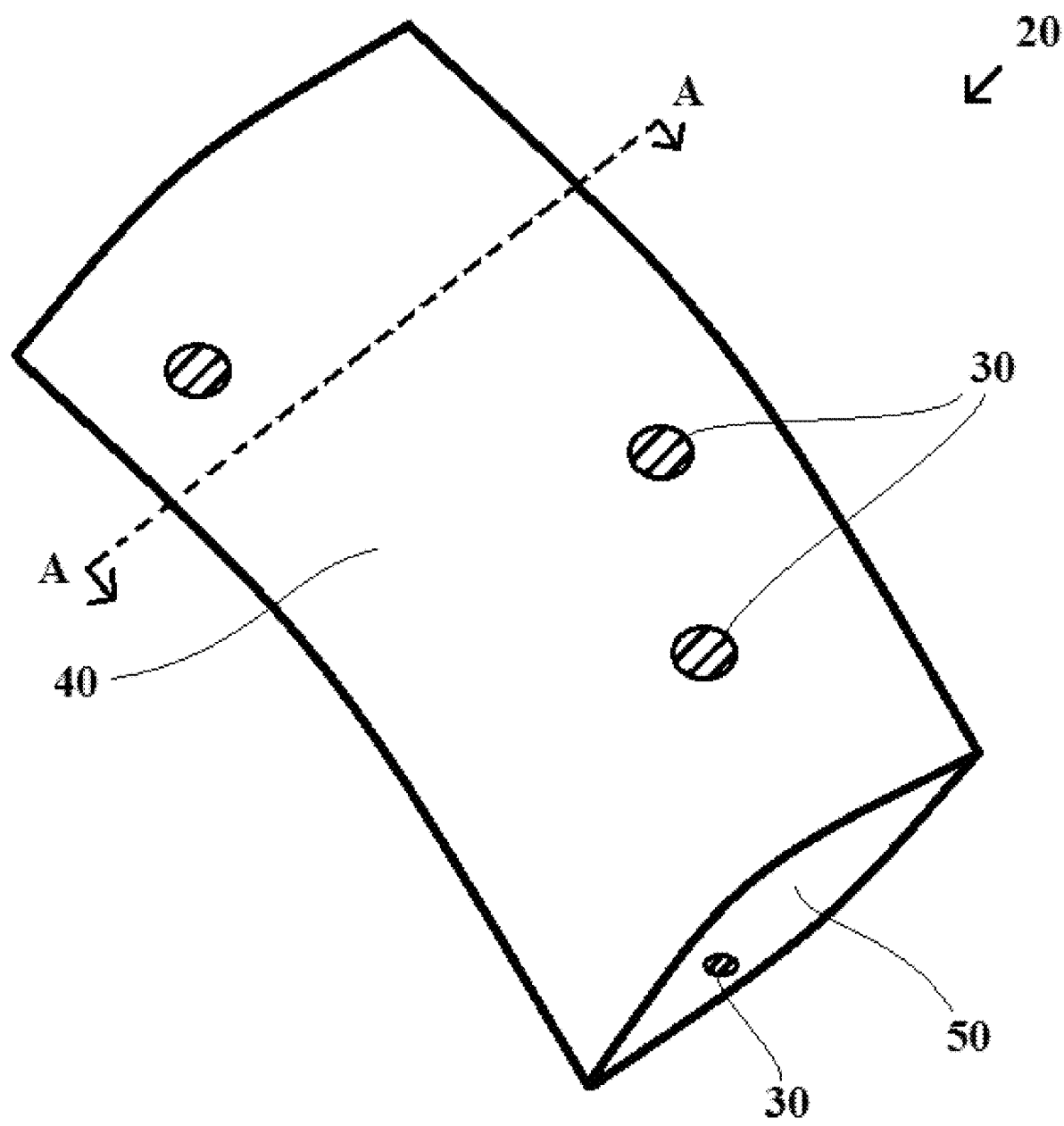
Figure 1C:
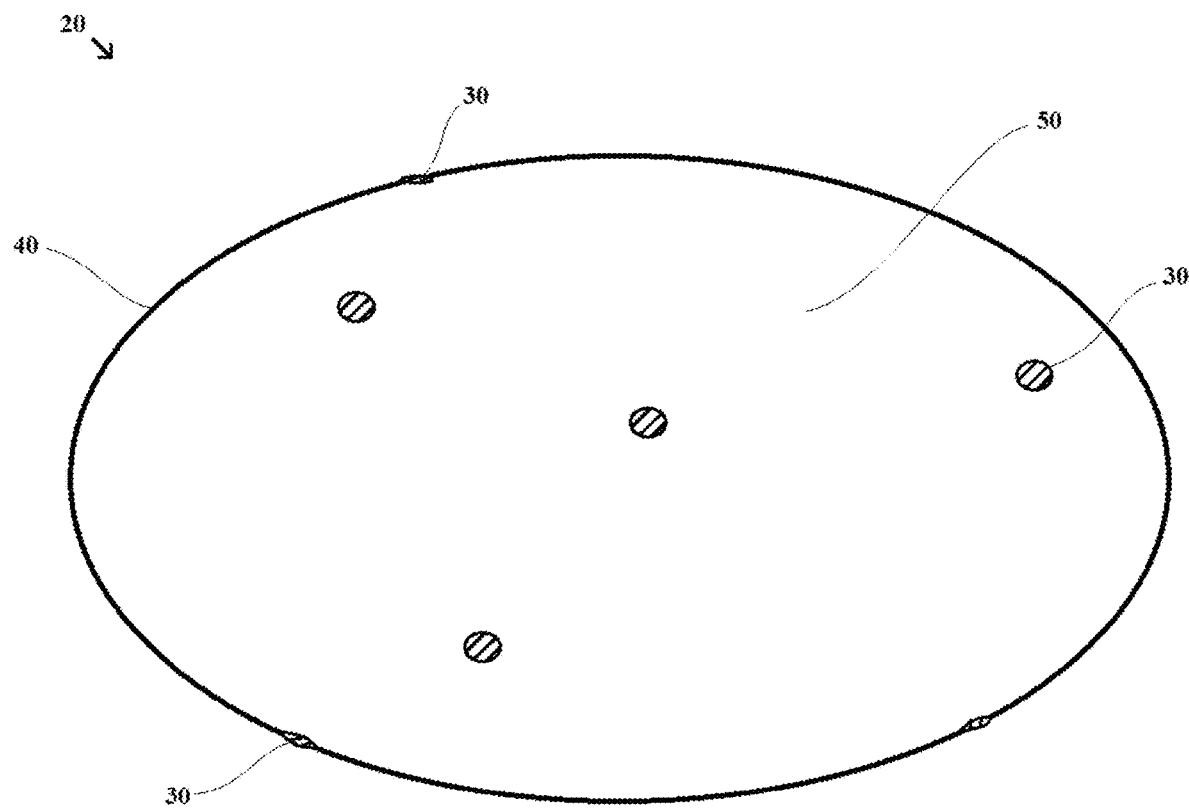

As seen in FIGS. 1B-1C, the filament 20 is a reinforced composite material having bioactive glass particles 30 both on its surface 40 and in its cross-section 50, and possessing bioactive properties. In some example embodiments, the filament 20 has a weight ratio of bioactive glass:polymer ranging from about 1:20 to about 1:1, or from about 1:10 to about 2:3.

The mixture to be extruded (and, in general, any composite described herein) may optionally further include one or more additives, such as, but not limited to, a plasticizer, an antioxidant, a thermal stabilizer, a UV stabilizer, a flame retardant, a lubricant, an antistatic agent, a foaming agent, a coloring agent, an antifogging agent, a nucleating agent, an antiblocking agent, a slip agent, or a radio-opaque agent. For example, a plasticizer may be added to increase flexibility, workability in processing, or an expanding property. An antioxidant may inhibit or block a chemical reaction between plastic and oxygen, thereby preventing the loss of physical properties due to degradation of the polymer. A UV stabilizer may prevent degeneration of a color or a mechanical property due to degradation of the polymer from UV rays. A flame retardant may reduce flammability of the polymer. A lubricant may lubricate a surface in contact with the polymer during processing, plasticizing, or extrusion to increase flowability. An antistatic agent may inhibit or remove generation of static electricity formed on a surface of the polymer. An impact reinforcing agent may enhance impact resistance of the polymer. A coloring agent may be added to color the polymer. An antifogging agent may increase a surface tension of a polymer film and enhance an affinity to water. A nucleating agent may stimulate a crystallization rate of a polymer, reduce a crystal size, enhance transparency, or increase a crystallization rate. A radio-opaque agent may render the mixture opaque to radiation such as X-rays. An example radio-opaque agent is Sr. Furthermore, a filler may be added to reduce a cost, or added to improve a mechanical, thermal, or electrical property or processability. Optionally, coloring (if desired) of the filament may be accomplished by the addition of a coloring agent. This does not reduce the antibacterial properties of the filament.

As noted above, the bioactive glass composition in the filament includes one of Ag, Au, Zn, K, P, Cu, Se, Ga, Ti, or V. These ions are released from the filament to provide beneficial properties such as antimicrobial activity. For example, the filament may release Na, K, and Zn ions to provide antibacterial properties. The release of ions can be controlled by the concentration of Zn in the bioactive glass composition. In general, the greater the concentration of Zn in the bioactive glass composition, the slower the release of antibacterial ions will be.

Once extruded, the 3D printable filament containing the bioactive glass can be 3D printed using parameters similar to those used for conventional 3D printable filaments. For example, the ideal parameters for printing a PLA-bioactive glass 3D printable filament may vary slightly from the ideal parameters for printing pure PLA. Specifically, the optimal nozzle temperature for printing some embodiments of the PLA-bioactive glass 3D printable filament is about 225° C., whereas the ideal nozzle temperature for printing pure PLA is about 220° C. The optimal bed temperature for printing some embodiments of the PLA-bioactive glass 3D printable filament is about 65° C., which is about the same as for printing pure PLA. The ideal % infill overlap is about 13%, compared to about 15% for pure PLA, and the optimal % flow is about 105%, compared to about 100% for pure PLA.

In some embodiments, the composites and filaments are entirely degradable because both the polymer and the bioactive glass are degradable. Furthermore, in some example embodiments, the polymer degrades quicker than the bioactive glass. The degradability of the composites and filaments, and/or their constituent polymer and bioactive glass composition, can be tailored for a desired application.

Some conventional 3D printable filaments use the polymers PLA and ABS. While these filaments provide ease of manufacturing and printability, they lack mechanical durability. This results in weak manufacturing parts and parts that cannot handle large loads. By reinforcing the filaments with bioactive glass fibers or particles, the material properties of the filament are improved. This allows for an increase in durability and strength of printed objects. Additionally, it is known that polymers such as PLA harbor bacteria with extended use. The present disclosure can provide a filament, such as a PLA filament, with antibacterial properties. Due to microorganisms' affinity for the crevices and ridges formed by the layers, the growth of bacteria and other microorganism is further compounded by the inherent structure of 3D printed objects. The bioactivity of the glass incorporated into the filament hinders the growth of these organisms, making them less likely to be contaminated by bacteria such as *E. coli*. Release of the antibacterial ions from the glass has an extended lifetime when compared to many other antibacterial agents which need to be replenished. Furthermore, the bioactive glass is biocompatible and contains nothing toxic to the human body.

Unlike known antimicrobial 3D printing filaments (such as the filament described in U.S. Pat. No. 9,523,160), the filament described herein has bioactive glass in either particle or fiber form incorporated into the filament that provides antimicrobial properties. Thus, the filament does not need to include an additional antimicrobial agent which would not last as long as the release of antimicrobial ions from the glass and therefore need to be replenished. Furthermore, the filament is reinforced by the bioactive glass, and therefore can be made stronger than known antimicrobial 3D printing filaments. Thus, the filaments described herein have many advantages over known 3D printable filaments.

Though 3D printable filaments are described herein for exemplary purposes, the bioactive glass composition described, and the bioactive glass/polymer composite described, can be used for a wide variety of other applications, especially applications for which antibacterial properties are desired. For example, the composite may be used for medical devices, such as to form catheters or endotracheal tubes which have antibacterial activity. Gamma irradiation has no effect on the glass structure. Thus, the composites herein can be sterilized by irradiation, and therefore are compatible with medical devices which undergo sterilization by irradiation. The composites may also be sterilized by other methods, such as heat treatments.

As another example, the composite may be used to form plastic packaging, such as food packaging or packaging for sterile medical devices. The compositions and composites described herein can also be used in medical applications, such as for dental implants, bone tissue scaffolding, and the like. It is understood, however, that for non-3D printing applications, it may be optimal to make the composite or article using glass fibers and not glass powders.

The compositions and methods described herein can be embodied as parts of a kit or kits. A non-limiting example of such a kit is a kit for making a 3D printable filament, the kit comprising a bioactive glass composition and a polymeric material in separate containers, where the containers may or may not be present in a combined configuration. The bioactive glass composition may comprise particles or fibers and includes at least one of Ag, Au, Zn, K, P, Cu, Se, Ga, Ti, or V. Many other kits are possible, such as kits further comprising an extrusion device. The kits may further include instructions for using the components of the kit to practice the subject methods. The instructions for practicing the subject methods are generally recorded on a suitable recording medium. For example, the instructions may be present in the kits as a package insert or in the labeling of the container of the kit or components thereof. In other embodiments, the instructions are present as an electronic storage data file present on a suitable computer readable storage medium, such as a flash drive. In other embodiments, the actual instructions are not present in the kit, but means for obtaining the instructions from a remote source, such as via the internet, are provided. An example of this embodiment is a kit that includes a web address where the instructions can be viewed and/or from which the instructions can be downloaded. As with the instructions, this means for obtaining the instructions is recorded on a suitable substrate.

EXAMPLES

Example I—Zinc Glass

In this example, glass compositions were analyzed for the ability of ZnO to control the leaching of $K^+$ and $Na^+$, which when left uncontrolled can create cytotoxic environments. ICP and bacteria testing supported this effect of the addition of ZnO. MAS-NMR was used to show that the $Zn^{2+}$ does not control release rate via acting as network former. Alternatively, without wishing to be bound by theory, it is believed that the $Zn^{2+}$ allows for a non-wetting oxygen layer to be deposited on the surface of the glass, as well as the formation of Si–O–Zn–O—Si intra-tetrahedral links in order to provide the observed resistance to ion release. A bioactive glass composition that incorporates ZnO to control cytotoxic burst releases of $K^+$ and $Na^+$, as well as provides favorable conditions for bone development, is described in the example.

Materials and Methods
Glass Production

The compositions evaluated in this example were composed of varying amounts of ZnO and MgO in a glass series containing $SiO_2$ (45%), SrO (10%), $Na_2O$ (10%), and $K_2O$ (5%), as specified in Table 1. To ensure proper mixing, all reagents were mixed on a roller for an hour. Following the mixing process, the powder of the analytical grade reagents was fired at 1500° C. for 1 hour in a platinum crucible. A standard shock quench method in water was then used to produce glass frit. The resulting frits were dried in a muffle furnace for 1 hour at 100° C. Frits were then ground into a fine powder using a planetary ball mill with a Yttrium stabilized zirconia grinding media and jar.

Additional buttons of glass were formed for use in various analyzation techniques. Similar to forming frit, well-mixed reagents were heated in the furnace at 1500° C. for one hour. To form buttons, glass was poured from the crucible onto a 316 SS plate and allowed to cool in ambient temperature.

TABLE 1

| Glass | Glass compositions (mol. fractions) | | | | | |
| --- | --- | --- | --- | --- | --- | --- |
| | $SiO_2$ | $Na_2O$ | SrO | $K_2O$ | MgO | ZnO |
| KC Con | 0.45 | 0.1 | 0.1 | 0.05 | 0.3 | 0 |
| KC 1 | 0.45 | 0.1 | 0.1 | 0.05 | 0.25 | 0.05 |
| KC 2 | 0.45 | 0.1 | 0.1 | 0.05 | 0.2 | 0.1 |
| KC 3 | 0.45 | 0.1 | 0.1 | 0.05 | 0.15 | 0.15 |

Glass Characterization
Size Analysis

Particle size analysis (PSA) was run on the glass powder using a Z2 Coulter Counter (Beckman Coulter, Ind. USA). Furthermore, Braunauer, Emmet, and Teller (BET) surface area analysis was run using an accelerated surface and poisometry (ASAP) machine (Micrometrics, Minn. USA). ASAP conditions were run in Nitrogen up to 300° C. with a pressure range from 0.1 to 1 mmHg.

BET Analysis

Brunauer, Emmett, and Teller (BET) surface area measurements were taken with the use of an accelerated surface and porosimetry (ASAP 2020) machine (Micromeritics, USA). All samples were degassed prior to analysis at temperatures reaching 300° C. for a total time of 12 hours. All samples were analyzed from 0.01 to 1.0 relative pressure (P/Po) in Nitrogen.

X-Ray Diffraction

X-Ray diffraction (XRD) (Rigaku Ulitima III, Japan) was run on the fine glass powder. Samples were densely packed until the analysis surface was visually flat. The focused beam geometry was used while analyzing the samples from 10 to 90 degrees with a step size of 0.05 degrees and a count time of 1.0 s.

To assess the amorphous nature of the buttons poured, as to confirm that the variance in cooling methodology had no effect on state of crystallinity, a sample button was ground into a fine powder using the same grinding procedure as the frit, and was analyzed with identical parameters as the ground frit powder.

Thermal Analysis

Differential thermal analysis (DTA) was run using a Q600 (TA Instruments, Del. USA). Approximately 0.12 mg of glass powder was analyzed in a platinum crucible with a clean platinum crucible used for reference. A flow rate of 100 ml/min of air was used during the analysis which was run from room temperature to 1000° C. at a ramp rate of 20° C./min.

MAS-NMR

Magic angle spinning (MAS) nuclear magnetic resonance (NMR) was performed using a $Si^{29}$ nucleus solid state probe a Bruker Avance NMR spectrometer (Bruker Corp., Mass., USA), which was equipped with a 9.4 T magnet. The reference used was polydimethylsiloxane with the secondary chemical shift standard at −91.34 ppm. The powder samples were packed into a 7 mm ceramic rotor and spun at 7 kHz. Each sample underwent 200 scans with a single pulse excitation of an 80° pulse length. To ensure proper relaxation, a relaxation time of 60 s was utilized. MAS-NMR results were then used to identify the Q-species of the glass.

Experimental
Wettability

Contact angle measurements were performed on a CAM-MICRO Contact Angle Meter (Tantec, Pa. USA). Ultrapure water droplets were deposited on the surface of the glass buttons via a needle drop application. Shadows of the droplet were displayed on an angle grid and a dial hand was used to visually determine the contact angle. Ten measurements were taken for each glass.

Ion Release Study

A primary ion release study was used to identify burst release of ions. In this example, 0.5 g of glass was agitated in 10 ml of ultrapure water at 37° C. for 24, 48, and 72 hr. The resulting solution was made into a 0.5% nitric acid and evaluated with an inductive coupled plasma (ICP) machine, the XSeries 2 ICP-MS (Thermo Scientific, Winsford, UK).

Bacterial Studies

*Escherichia coli* (*E. coli*) was employed to evaluate cytotoxicity and the antibacterial properties of the glass. For this experiment, 0.5 g of glass powder was introduced to 15 ml of Luaria-Bertani (LB) broth along with 10 μl of LB broth containing a culture of *E. coli* that was grown over night. After 12 hours of growth, the cultures were diluted before being plated on LB agar plates. A qualitative analysis of the inhibition of cellular growth was determined after 24 hours of growth.

Results and Discussion

Figure 2:
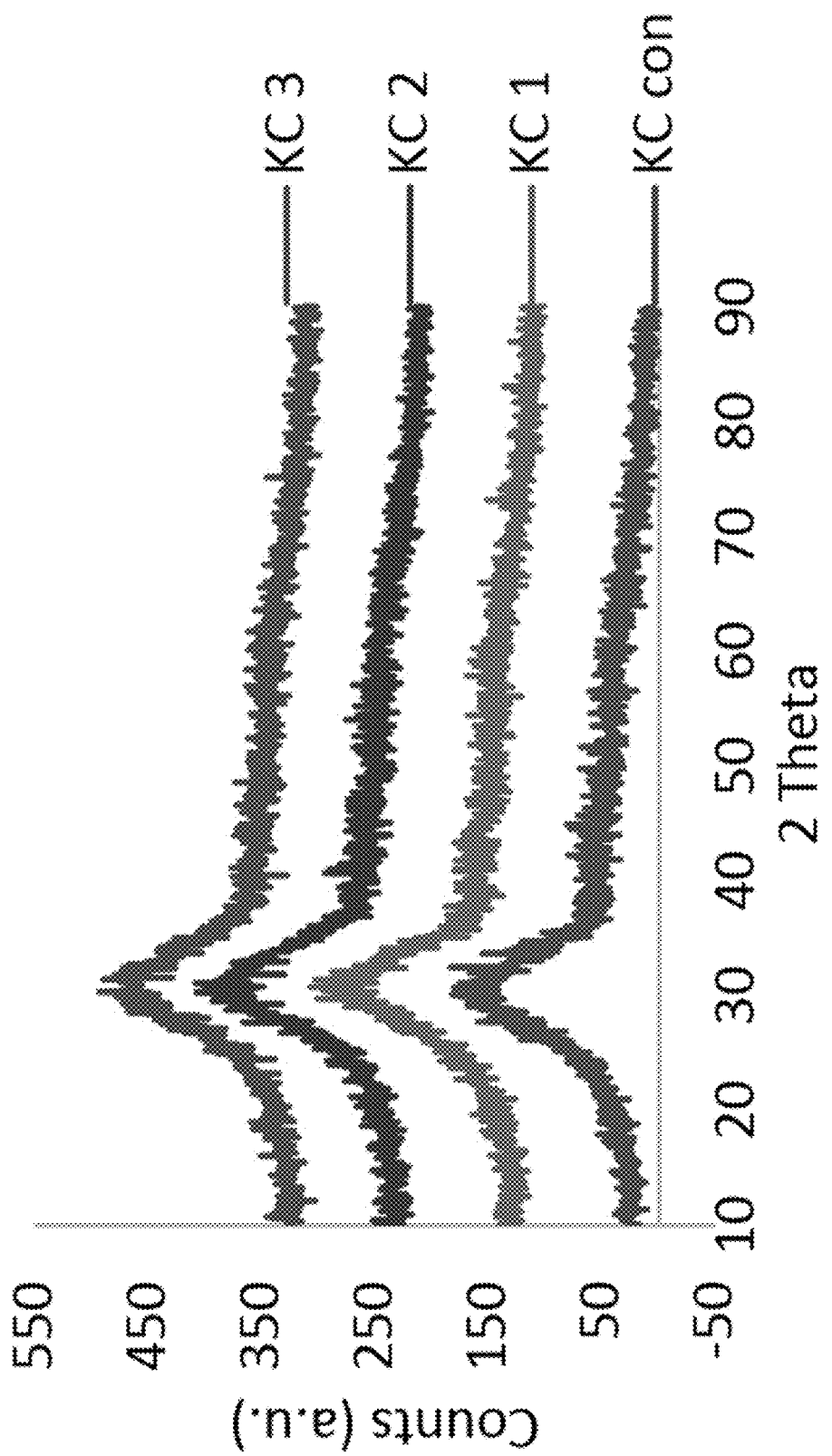
FIG. 2: XRD results for example glass series.

The lack of crystalline peaks and the presence of an amorphous hump in each of the XRD data sets (FIG. 2) confirms the amorphous nature of the glass series. Furthermore, this pattern and lack of peaks was also seen for the ground button sample.

Table 2 summarizes the DTA, PSA, and BET results. Glass transition temperatures ($T_g$) as determined by DTA followed the trend for increasing $T_g$ with respect to increasing ZnO content. The increasing trend agrees with the general trend that higher levels of alkali earth metal ions, especially $Mg^{2+}$, is correlated to lower $T_g$. While there was an identifiable trend in $T_g$, there were no significant differences between the mean particle size or surface area of the four glasses. Surface Area (SA) was also determined with BET and showed no significant variance in SA from glass to glass.

TABLE 2

Characteristics of glass series

| Glass | $T_g$ (° C.) | Mean Particle Size (μm) | S.A. (m/g) |
|---|---|---|---|
| KC Con | 543.92 | 11.04 ± 7.94 | 0.1988 |
| KC 1 | 552.36 | 11.32 ± 8.44 | 0.2003 |
| KC 2 | 553.25 | 10.64 ± 6.85 | 0.2363 |
| KC 3 | 554.95 | 10.83 ± 7.65 | 0.1913 |

Agreeable similarities between the particle size and surface area indicate that should the ion release rate be variable, it is not from a cause of discrepancy in the particle's physical features.

Figure 3:
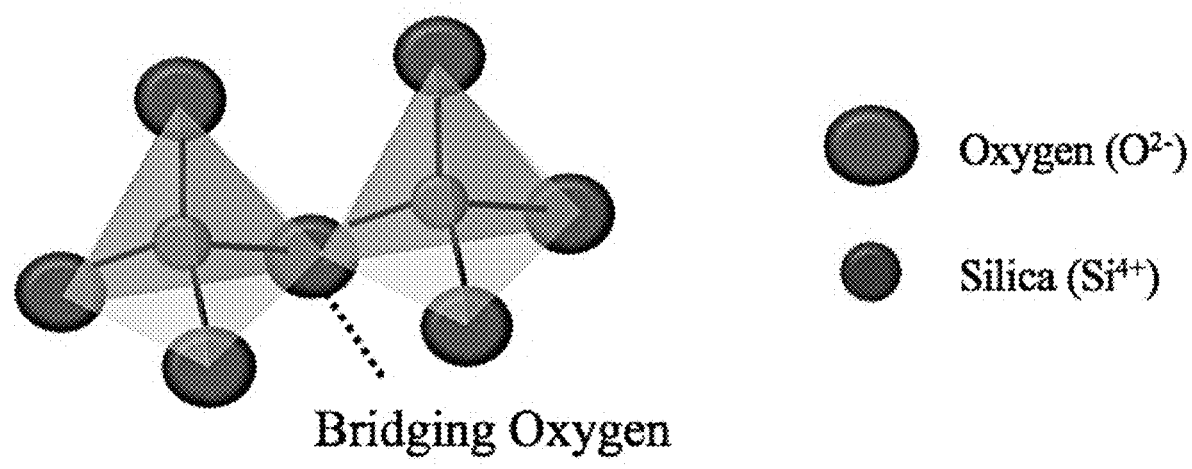
FIG. 3: A bridging oxygen illustration joining two silica tetrahedra.

The Q species of a glass, as mentioned above, can be determined via MAS-NMR. With values ranging from $Q^0$-$Q^4$, these species are indicative of the number of bridging oxygens between silica tetrahedra in the glass network (FIG. 3). A $Q^0$ value is representative of a system where there are no bridging oxygens, and a $Q^4$ value is representative of a system where all four oxygens are bridging. Because of the high bond density, $Q^4$ glasses are considered inert, while the considerable majority of bioactive glass compositions range between $Q^2$ and $Q^3$.

Figure 4:
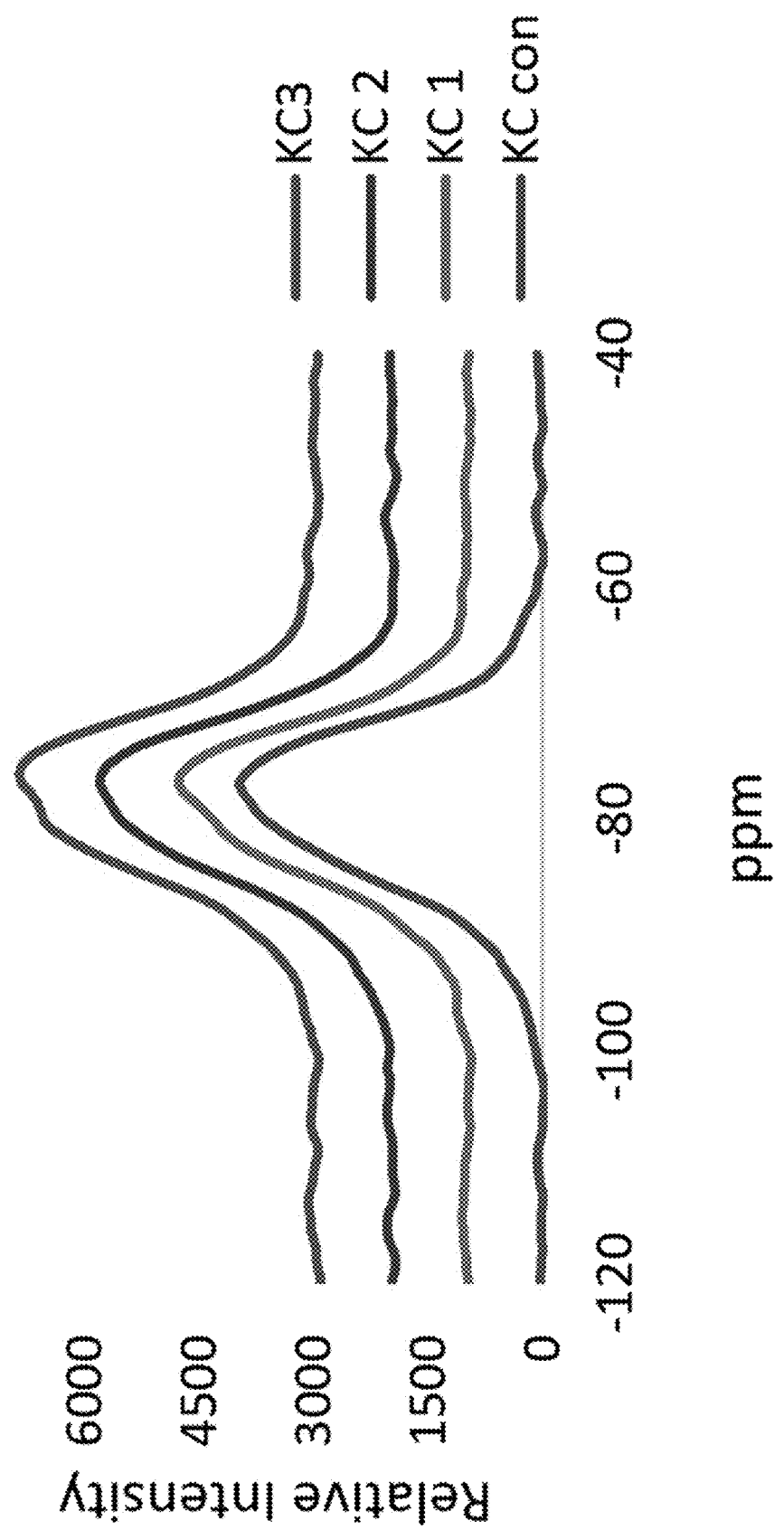
FIG. 4: MAS-NMR data for example glass series.

There were no significant variances in the Q-species, or concentration of non-bridging oxygens in the $SiO_2$ network, as determined by MAS-NMR (FIG. 4). All four glasses had peaks at −77 ppm, which is indicative of $Q^1$ and $Q^2$ species, meaning that the glass is very reactive.

Assuming that $Zn^{2+}$ behaves as a network modifier, the network connectivity (NC) calculations were done to validate the MAS-NMR data (Eq. 1):

$$NC = 2 + \frac{BO - NBO}{TOTAL\ BO} \quad \text{(Eq. 1)}$$

where NC values are representative of the average number of bridging oxygens (BO) per tetrahedra by taking into account the number of possible non-bridging oxygens (NBO) present in the system. For this glass the NC value is 1.55, in agreement with the −77 ppm MAS-NMR peak location, which is known to be a result of a $Q^1$-$Q^2$ system.

For the reason that there is no shift in Q species, in accordance with the calculated NC (1.55), where Zn acted as a modifier, it can be ascertained that zinc is not acting as an intermediate in this system.

Figure 5A:
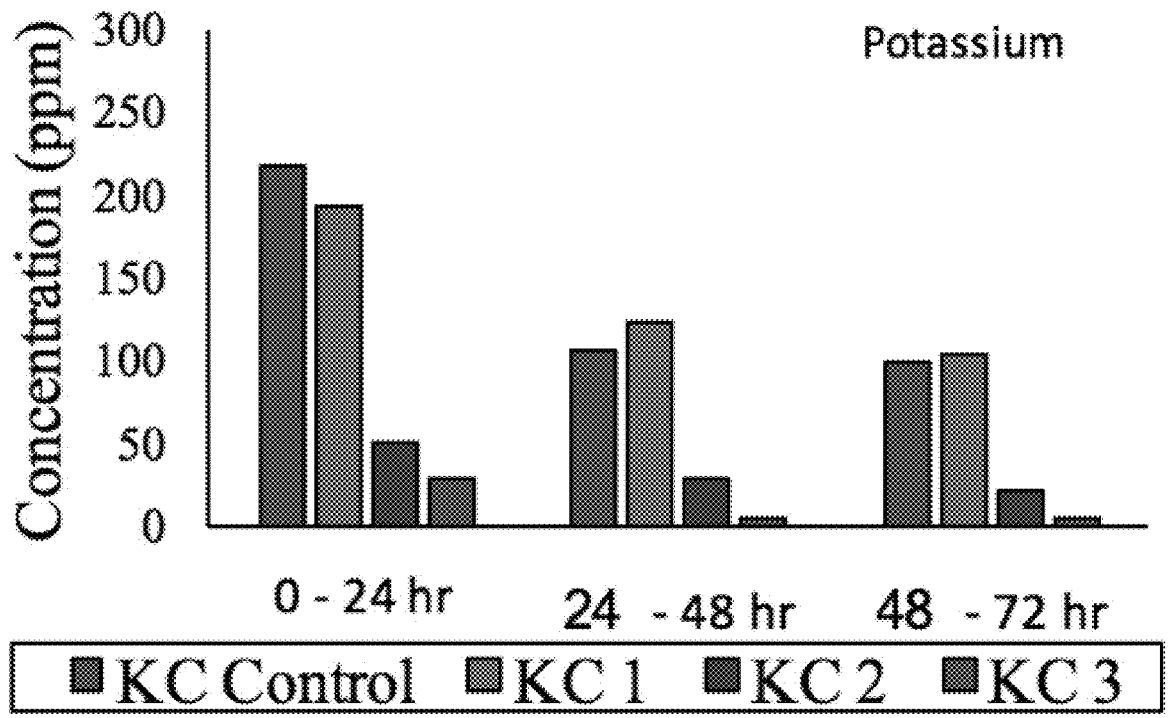
FIGS. 5A-5B: Ion release of $K^+$ ions (FIG. 5A), and ion release of $Na^+$ ions (FIG. 5B).
Figure 5B:
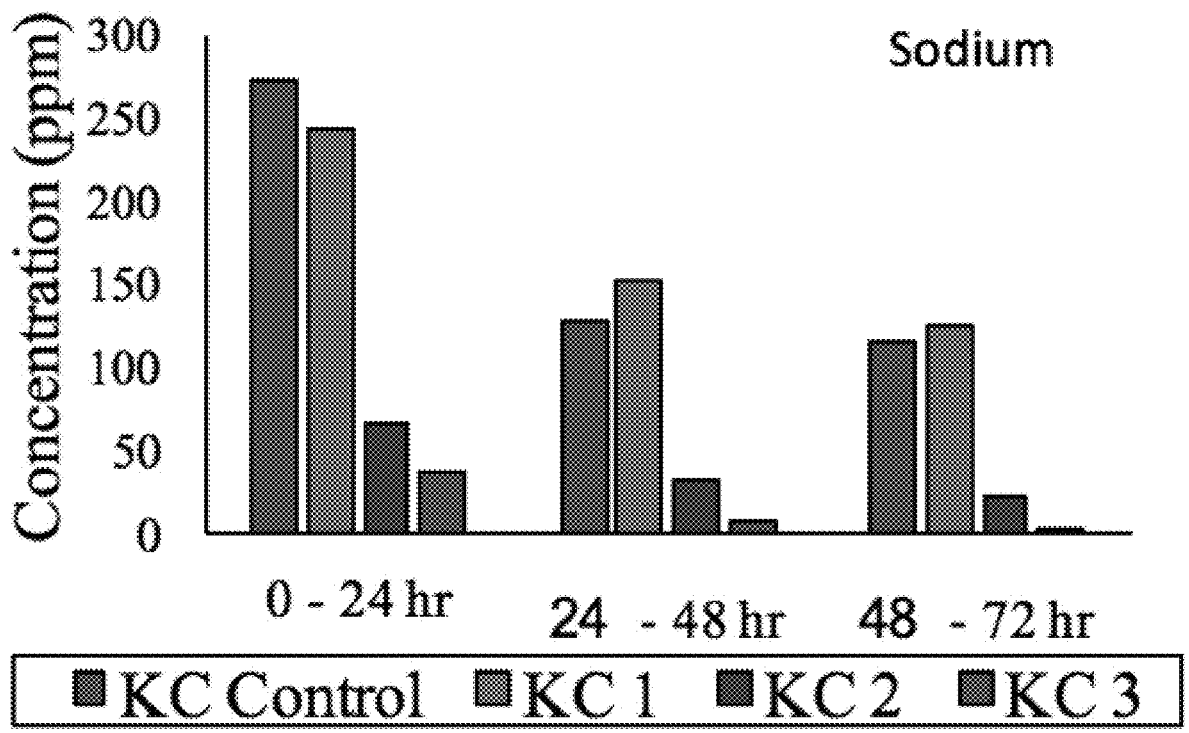

Results of the ICP study for $K^+$ and $Na^+$ can be seen in FIGS. 5A-5B, respectively. These ions were chosen to be analyzed for burst release because they are the first to react with $H^-$ ions in an aqueous environment and, because of their large ionic size, more prone to burst release. For all four glasses, there is a waning number of ions leached over the 24, 48, and 72 hr time periods. It is also apparent that there is a trend for decreasing reactivity and tendency for burst release with elevated $Zn^{2+}$ concentrations.

Figure 6:
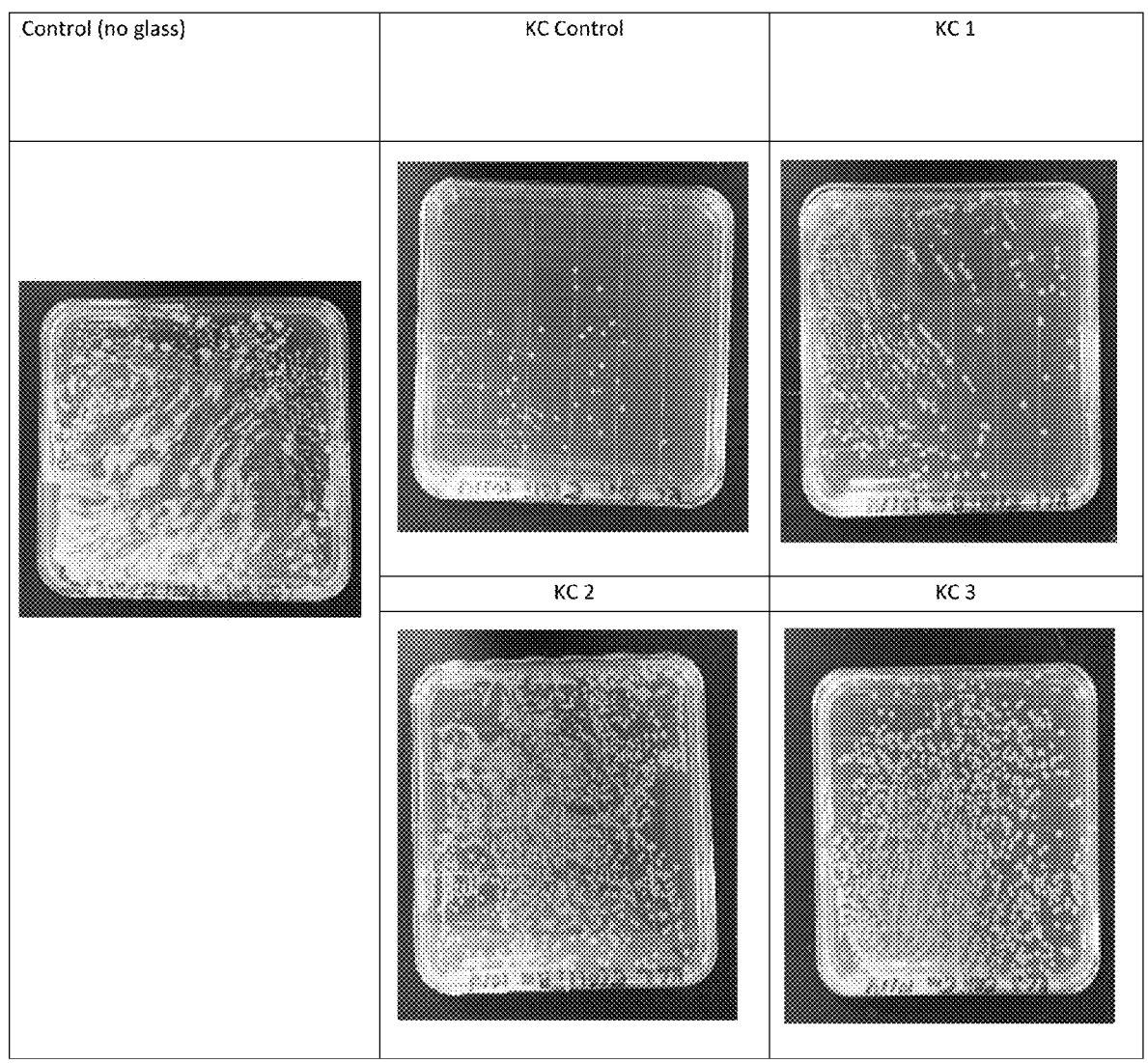
FIG. 6: Growth and inhibition of *E. coli* for control (left), KC control (upper left), KC 1 (upper right) KC 2 (lower left), and KC 3 (lower right) over 24 hr.

Bacterial studies further exemplified the toxicity of low $Zn^{2+}$ glass. FIG. 6 clearly shows massive cell inhibition in response to being cultured with KC Con and KC 1 as opposed to those cultured with the higher $Zn^{2+}$ content KC2 and KC3.

It is clear that cytotoxic levels of both $K^+$ and $Na^+$ were released from the control glass and the 5% ZnO compared to that of the 10% and 15% ZnO glasses. However, the MAS-NMR study already showed that the addition of $Zn^{2+}$ did not affect the number of NBO, so it is not increasing bond density that allows for controlled release. Furthermore, it was not a tightening of the network as when exchanging an ion with a large radius for a small one, owed to likeness in ionic radii between $Mg^{2+}$ and $Zn^{2+}$.

With no apparent bulk characteristics of the glass controlling the release rate, surface specific analysis was done to evaluate the response of the glass in an aqueous environment. Contact angle measurements taken on the glass buttons showed a drastic increase in surface energy with the addition of Zn into the system (Table 3).

TABLE 3

Contact angle measurements

| | KC con | KC 1 | KC 2 | KC 3 |
|---|---|---|---|---|
| Pre Heat Treatment | 57.5 ± 11.0 | 62.9 ± 5.6 | 88.5 ± 7.2 | 77.3 ± 7.4 |
| Post Heat Treatment | 51.1 ± 5.0 | 44.7 ± 7.1 | 48.3 ± 5.5 | 45.9 ± 3.6 |

Glasses with a concentration of 10-15% Zn had significantly higher contact angles than those with lower Zn concentrations. This increase of contact angle has been noted in other glass series. It was found that metal ions that can form octahedral units that can support the chemisorption of oxygen onto the surface of the glass at the oxygen deficient sites just above the outer plane of the octahedral formation. Without wishing to be bound by theory, it is believed that this oxygen creates a layer on the surface, making the glass more non-wetting. Yet, this phenomenon was only seen in glass formed by metal ions that form octahedral units. It is known that $Zn^{2+}$ ions form octahedral units when acting as a glass modifier.

In order to assess whether the surface of the glass was harboring a layer of oxygen, the glass was "degassed" in a furnace for 1 hour at 150° C. The buttons were allowed to come to room temperature in the furnace before contact angle measurements were made. After degassing, all of the glasses became wetting, validating the theory of an oxygen layer causing the aforementioned large contact angles. Furthermore, according to an analysis of all the measurements in a single factor Anova test, the contact angles after heat treatment were all statistically similar (p=0.084).

When substituting $Zn^{2+}$ for $Mg^{2+}$ in silica based glass, the NBO content typically remains the same. However, there is a notable decrease in the dissolution rate of ions. Without wishing to be bound by theory, it is believed that non-covalent Si—O—Zn—O—Si links strengthen the network, providing the resistance to dissolution and apatite formation. While this theory does not account for the change in contact angle observed, it could have an impact on the chemical stability of the overall glass. Furthermore, because this linkage is known to happen in glasses with no or low levels of alkali ions, significant differences in KC1 and KC2 are seen as the alkali levels go down with the substituting out of $Mg^{2+}$.

Conclusions

According to the ICP results, the addition of ZnO was effective in retarding the release of both $K^+$ and $Na^+$ from a highly reactive bioactive glass. Furthermore, the increase in cell growth during bacteria testing of KC 2 and 3 indicated that the release of these ions was no longer at cytotoxic levels, which was confirmed with ICP testing. While there was a decrease in the ions that were leached, it should be noted that the addition of ZnO did not completely end the dissolutions of ions. Rather, KC 2 and KC 3 exhibited a controlled release such that a cytotoxic burst release did not occur, but the material was still able to retain bioactivity and leach ions from the system.

Although ZnO was able to stabilize the release of ions from the glass network, according to the MAS-NMR results, it did not behave as a former or intermediate. Instead, the curves, which are characteristic of the connectivity of the network, showed that the addition of ZnO in the place of MgO had no effect on the concentration of non-bridging oxygens in the $SiO_2$ network.

Without wishing to be bound by theory, it is believed that the $Zn^{2+}$ is in an octahedral formation at the surface, allowing for the absorption of oxygen at deficient sites. This oxygen layer on the surface allows the material to behave more hydrophobically in an aqueous environment, thus controlling the dissolution rate. Additionally, it is believed that there is a non-covalent linkage between the Si—O—Zn—O—Si as the alkali concentration in the glasses are decreased. Such linkages provide chemical stability and prevent the penetration of water into the network, thereby providing a mechanism by which the $Zn^{2+}$ retards the ion release.

Example II—Copper Glass

Bioactive glass containing copper in addition to zinc was prepared. The following Table 4 shows the composition of the copper glass series.

TABLE 4

| Composition (by mol fraction) | | | | |
|---|---|---|---|---|
| | Control | CY 1 | CY 2 | CY 3 |
| $SiO_2$ | 0.4 | 0.4 | 0.4 | 0.4 |
| $Na_2O$ | 0.1 | 0.1 | 0.1 | 0.1 |
| $B_2O_3$ | 0.1 | 0.1 | 0.1 | 0.1 |
| $Cu_2O$ | 0 | 0.01 | 0.02 | 0.02 |
| ZnO | 0.4 | 0.39 | 0.39 | 0.38 |

Table 5 shows the particle sizes of the copper glass series. There was no significant difference in size between the particles of the various glasses. Therefore, particle size does not affect comparison of data of the glasses from tests such as ASAP and XRD.

TABLE 5

| Particle size | | |
|---|---|---|
| | Average (μm) | Standard Deviation |
| Control | 16.2366667 | 7.103333333 |
| CY1 | 16.5966667 | 8.046666667 |
| CY2 | 15.4866667 | 6.603333333 |
| CY3 | 15.6266667 | 6.583333333 |

Table 6 displays the BET surface area of the copper glass. As seen from Table 6, there was a significant difference in the surface area of the glasses with copper and those with no copper. This indicates that the topology or porosity is affected by the addition of copper.

TABLE 6

| Surface area of copper glass | |
|---|---|
| BET | $m^2/g$ |
| CON | 0.1875 |
| CY1 | 0.6193 |
| CY2 | 0.4604 |
| CY3 | 0.4678 |

Figure 7A:
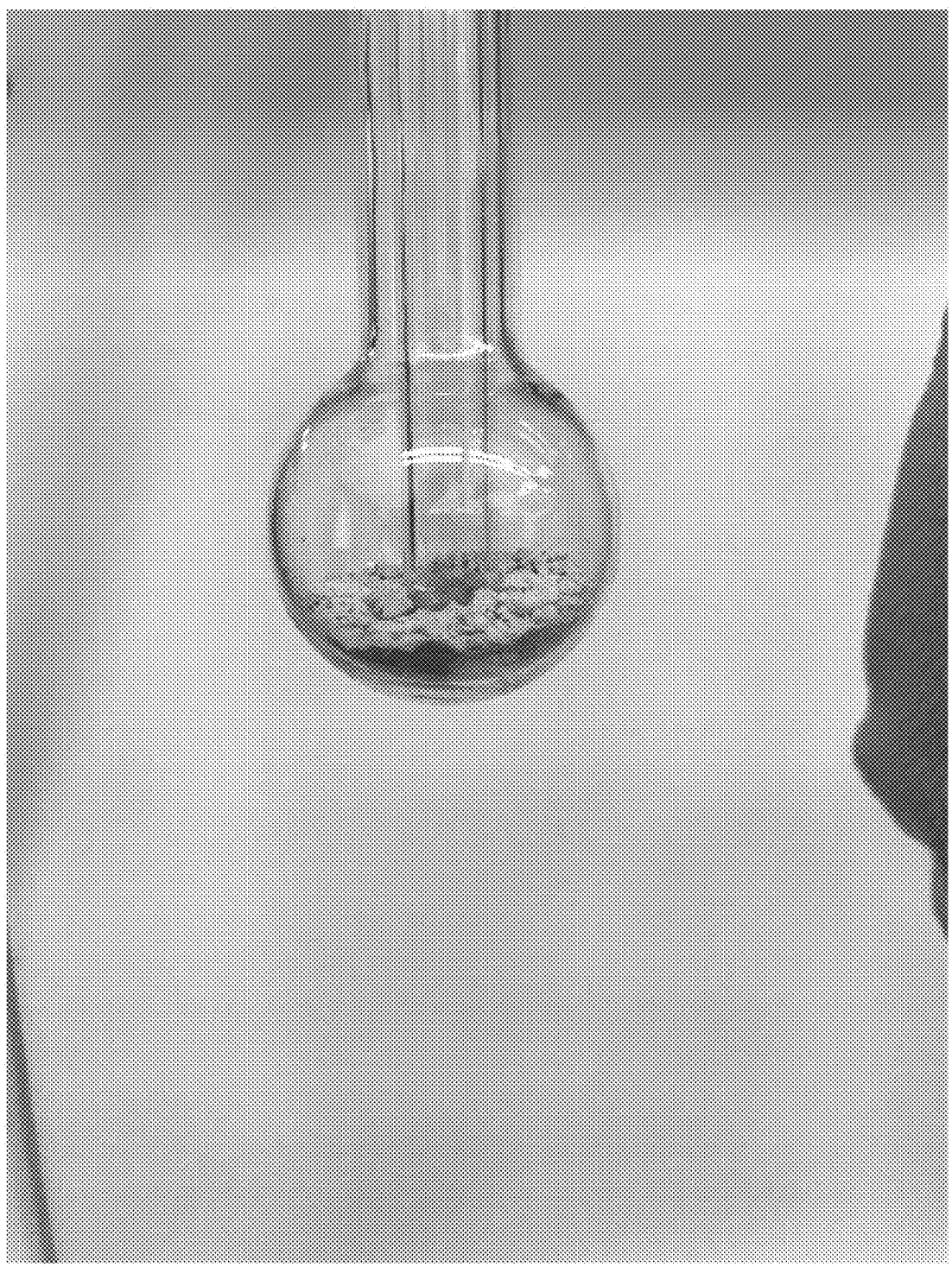
FIGS. 7A-7C: Photographs showing the difference in color between three bioactive glass compositions containing copper.
Figure 7B:
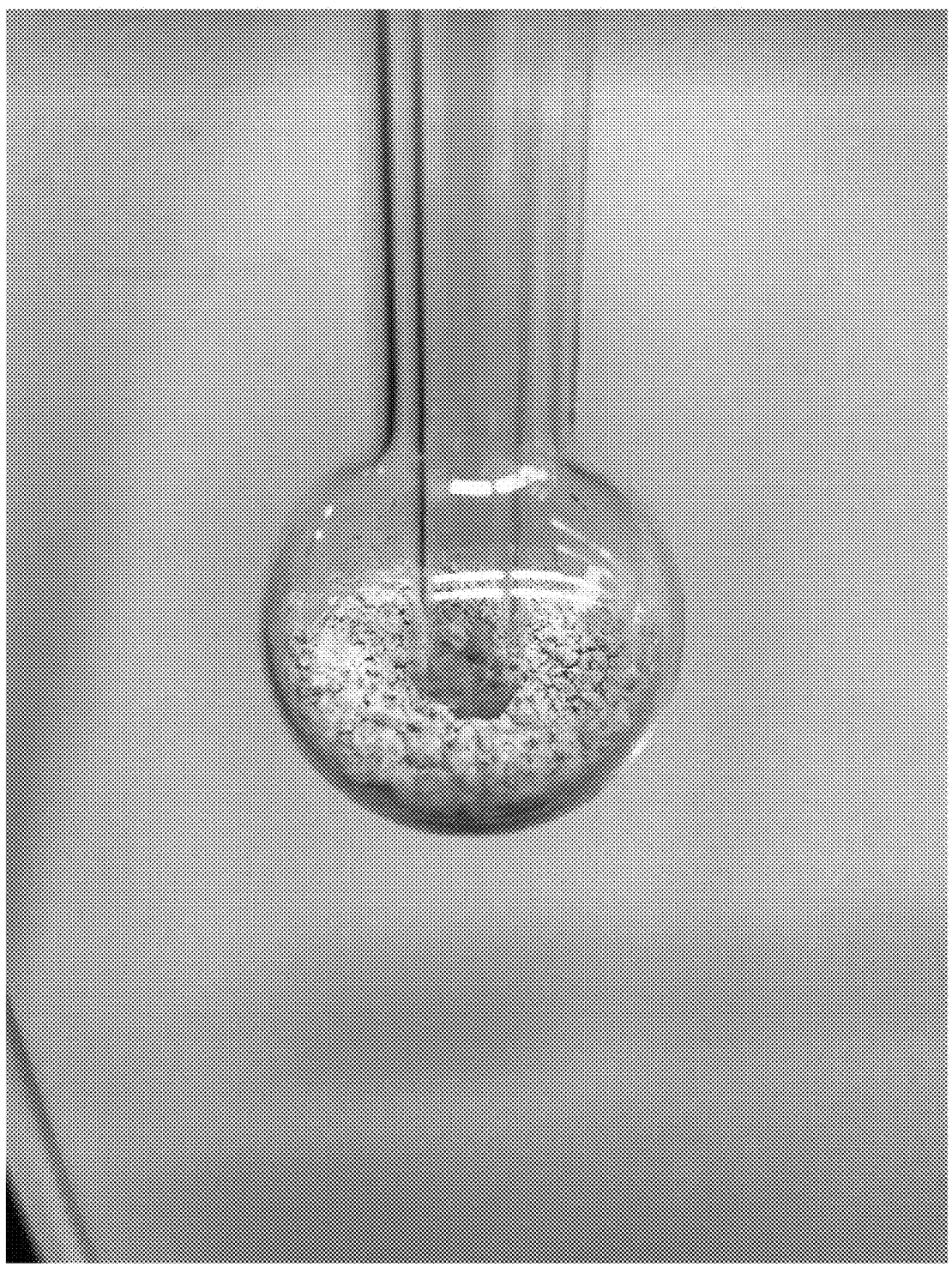
Figure 7C:
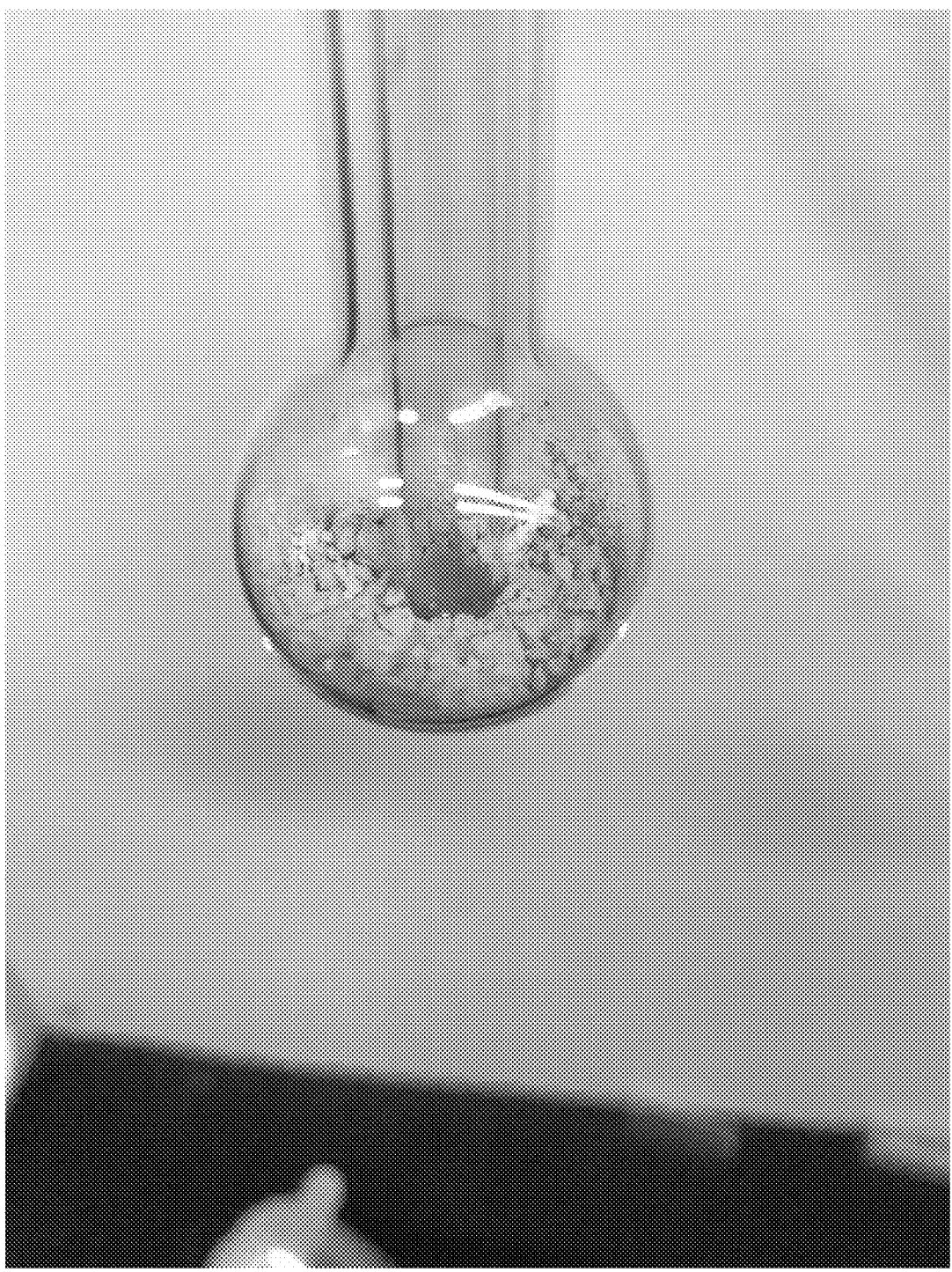

FIGS. 7A-7C show the color change of the copper glass, which was most drastic in CY1. CY1 is shown in FIG. 7A, CY2 is shown in FIG. 7B, and CY3 is shown in FIG. 7C. The color change in the glasses occurred after the samples were heated in oxygen deficient environments, indicating that the copper experiences various oxidative states in the glass. Surprisingly, the change in color was much more pronounced in the glasses with the lowest amount of copper.

Figure 8:
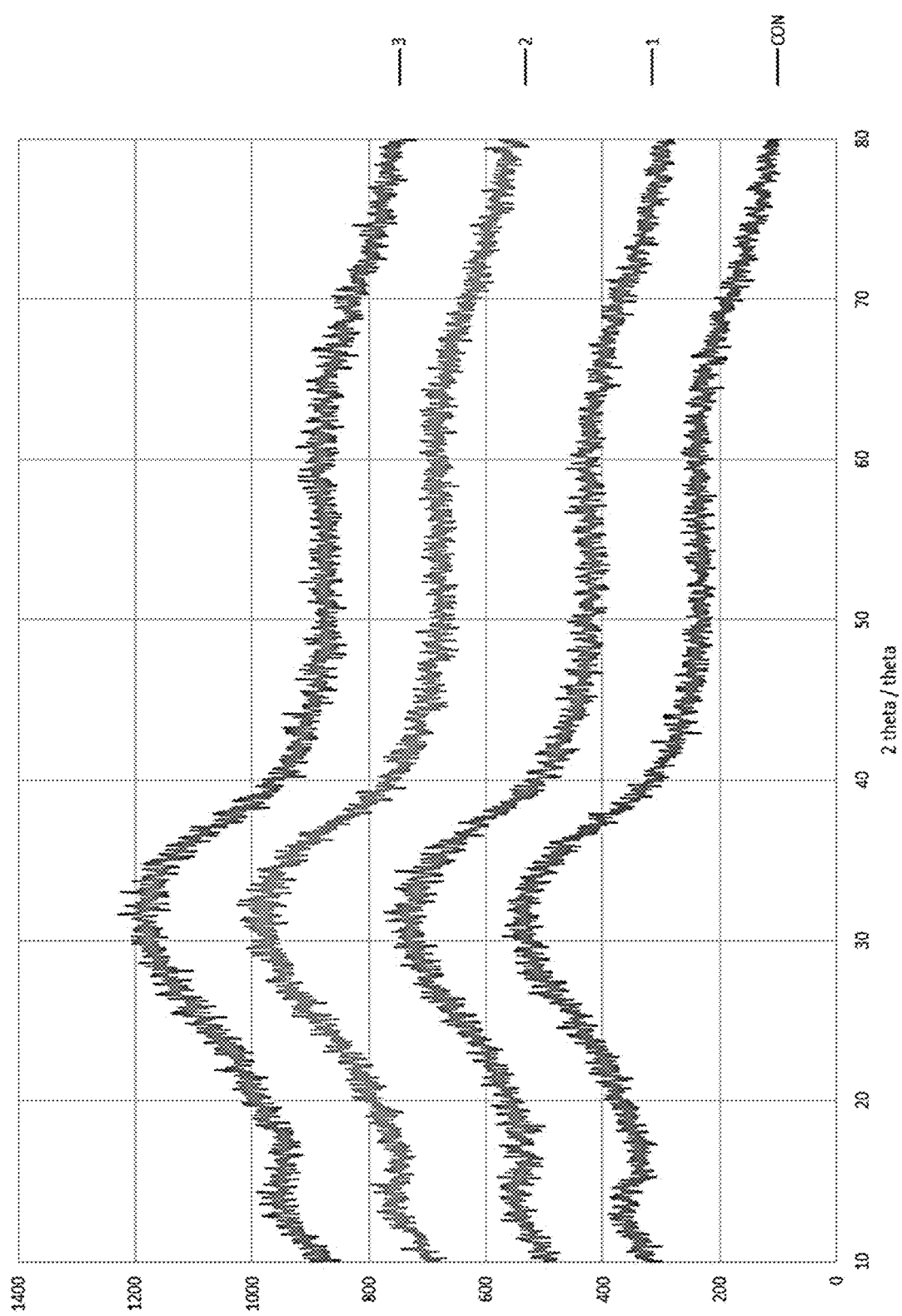
FIG. 8: XRD patterns of bioactive glass series containing copper. The patterns of the respective glass series are distinguished by color.
Figure 9A:
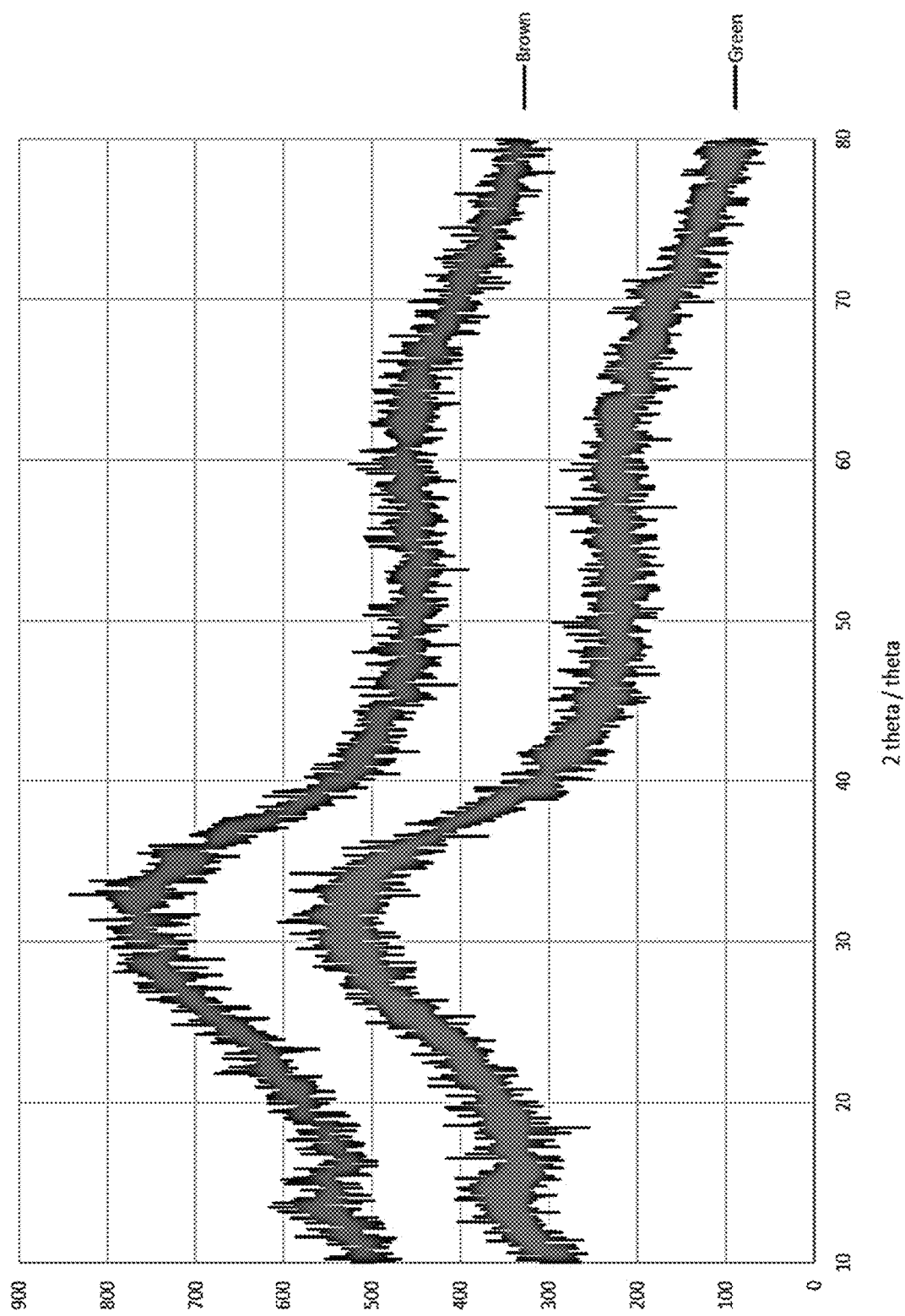
FIGS. 9A-9B: XRD patterns (FIG. 9A) of green versus brown glass, both of which turned gray after XRD as seen in the photograph in FIG. 9B.
Figure 9B:
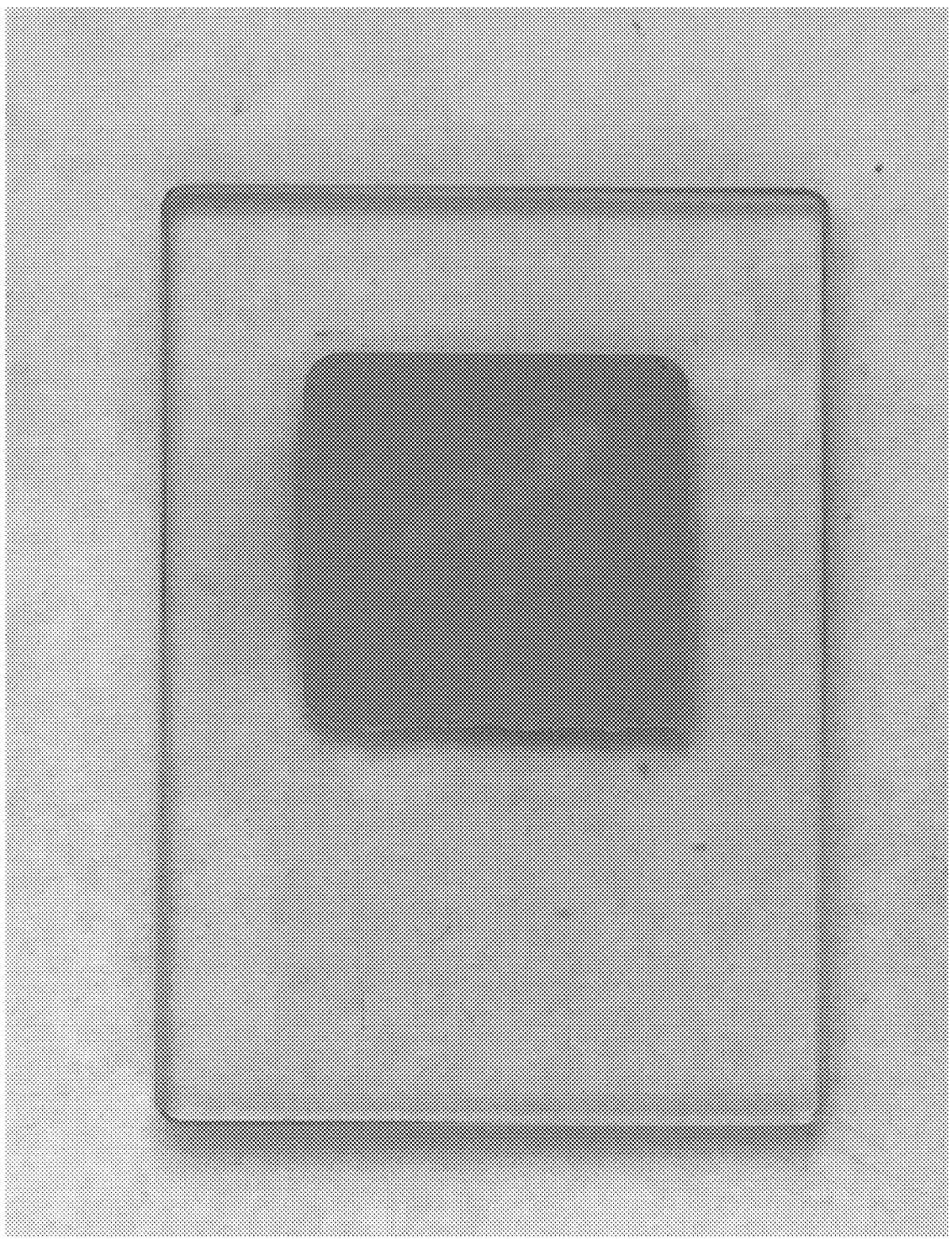
Figure 10A:
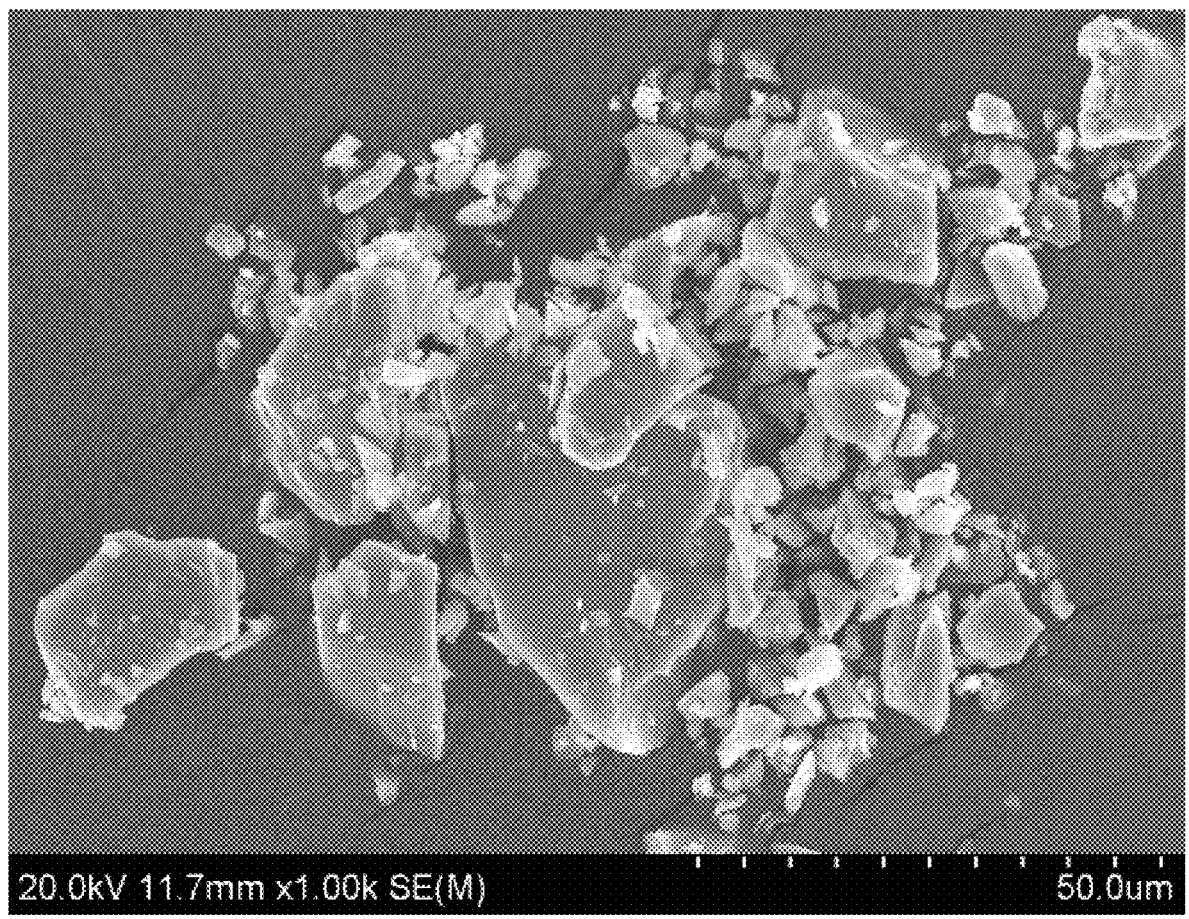
FIGS. 10A-10F: SEM images of control glass.
Figure 10B:
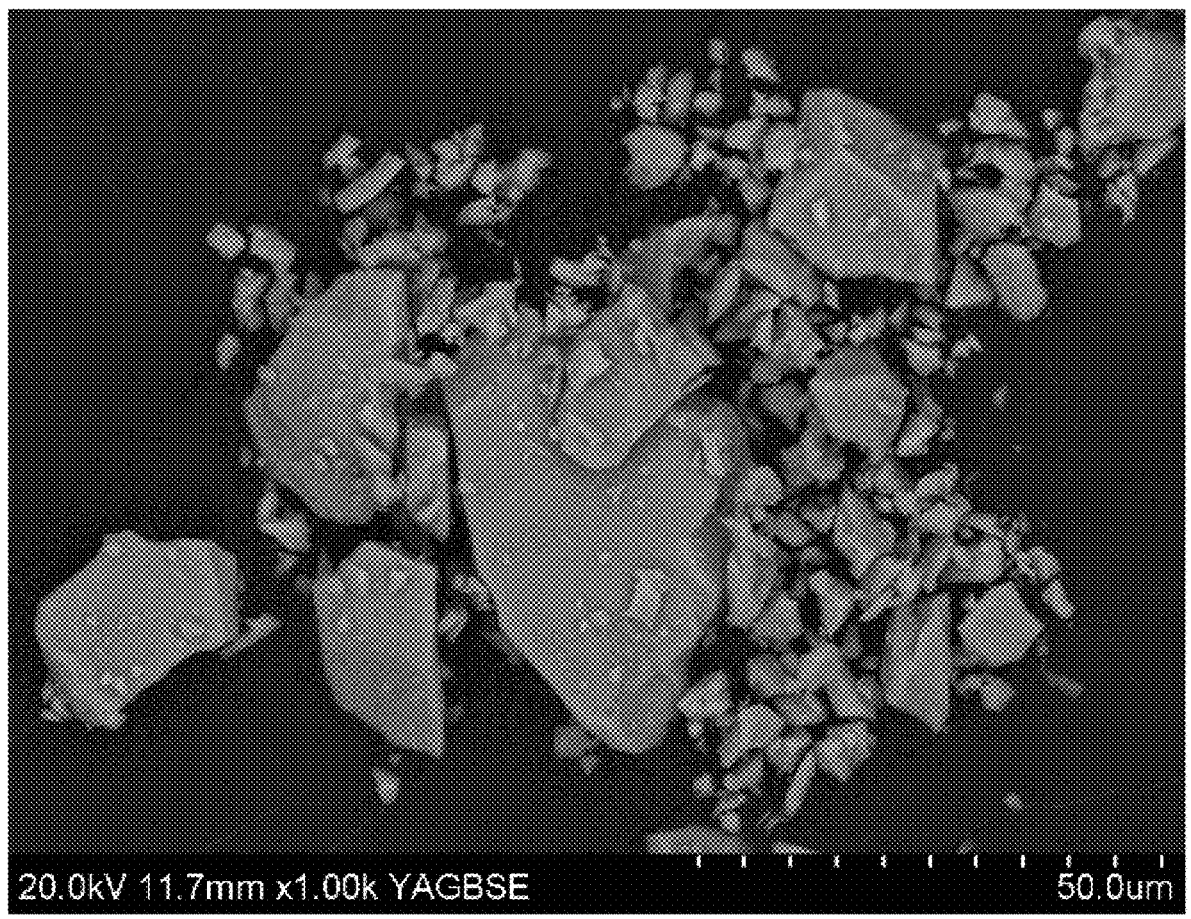
Figure 10C:
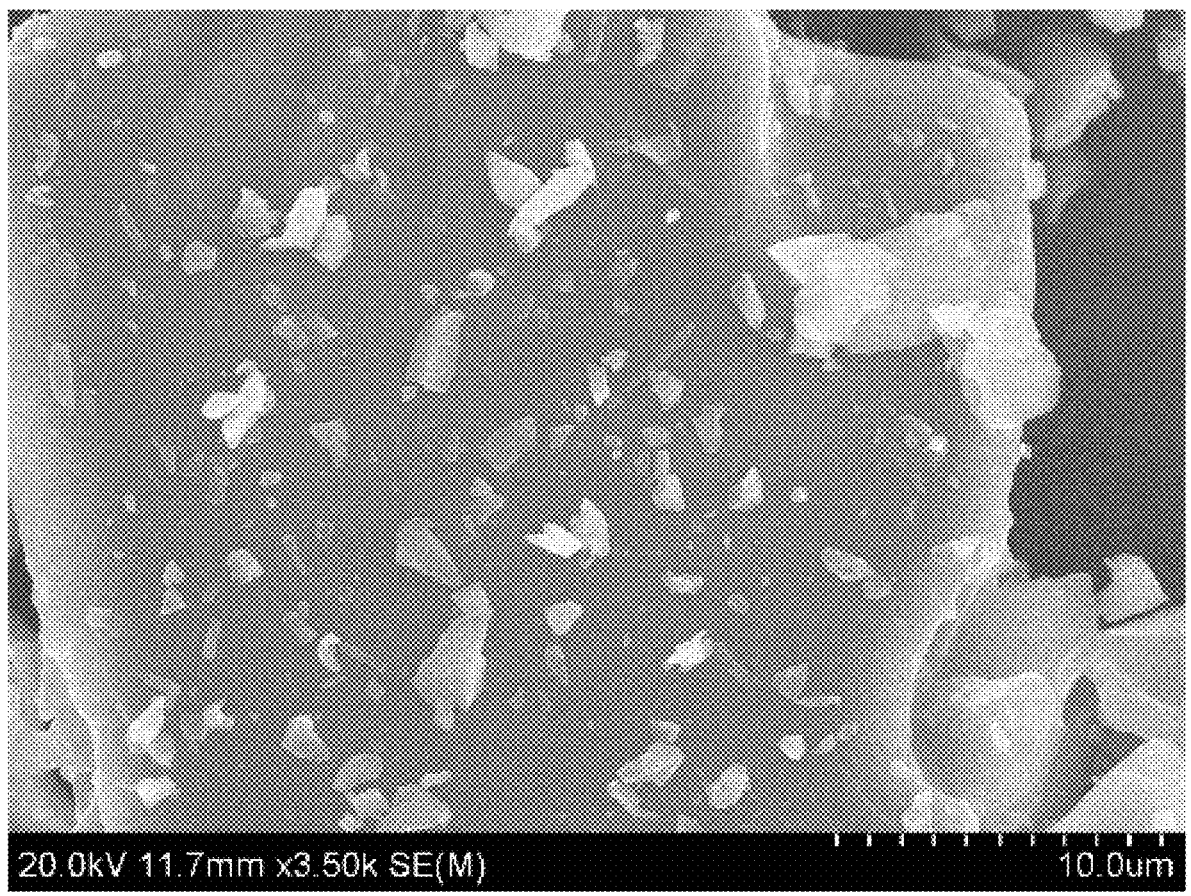
Figure 10D:
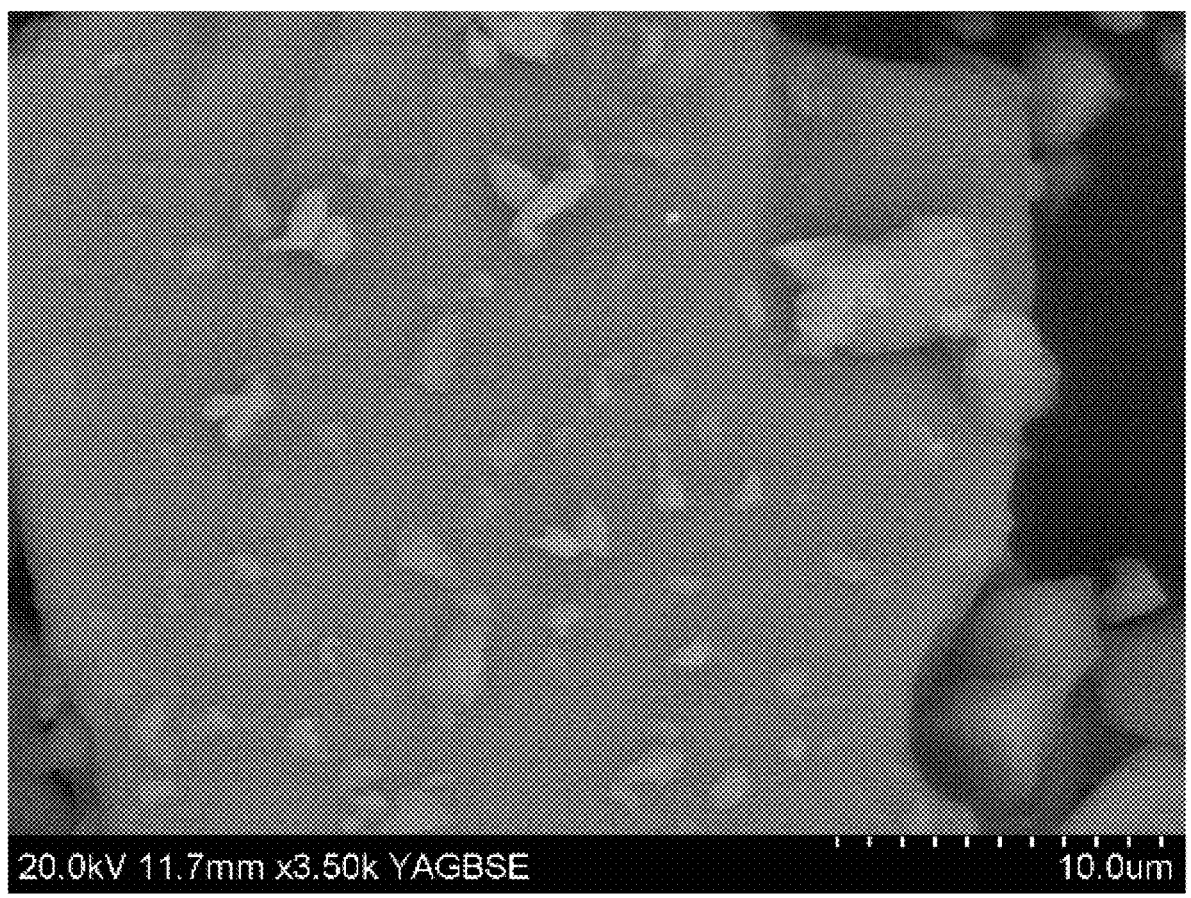
Figure 10E:
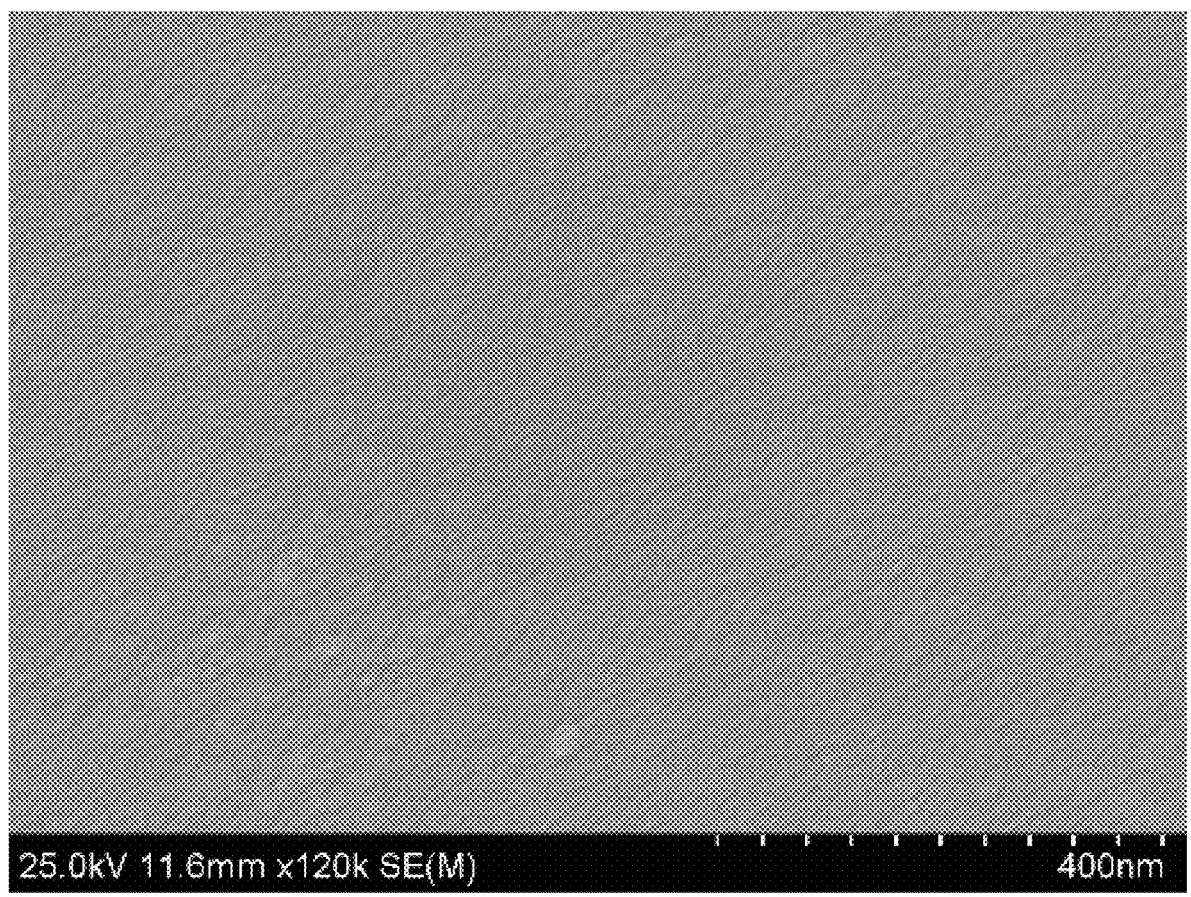
Figure 10F:
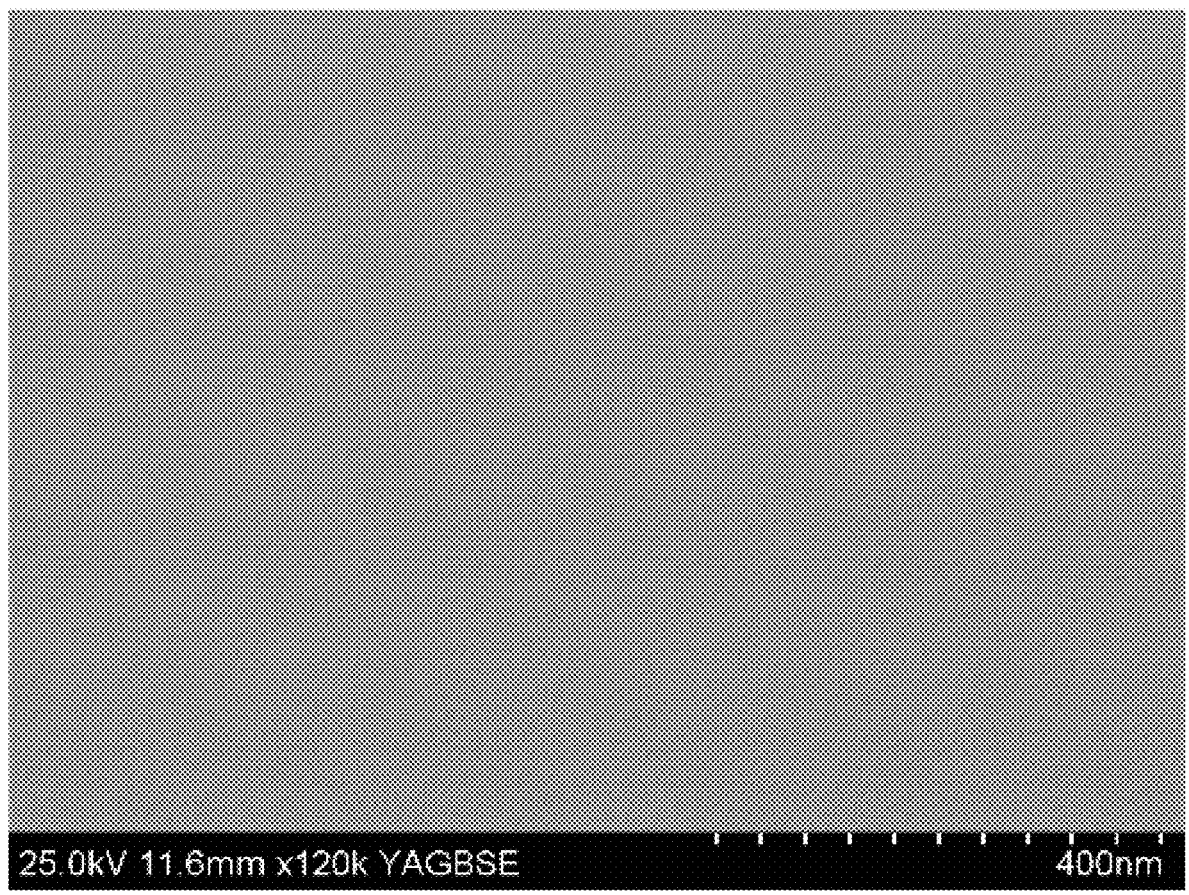

FIG. 8 shows the XRD patterns of CY1, CY2, CY3, and the control. There are no sharp peaks, indicating that the material is, in fact, an amorphous glass. FIG. 9A shows the XRD patterns of green versus brown glass, both of which turned gray after XRD (FIG. 9B). As seen in FIG. 9A, there are still no sharp peaks from the glasses that had undergone a color change. This shows that the glass had not changed color due to crystal formation, but instead remained an amorphous glass. Still further color change was noted after exposure to X-rays (FIG. 9B), but the exact mechanism that causes it is yet to be identified.

Figure 11A:
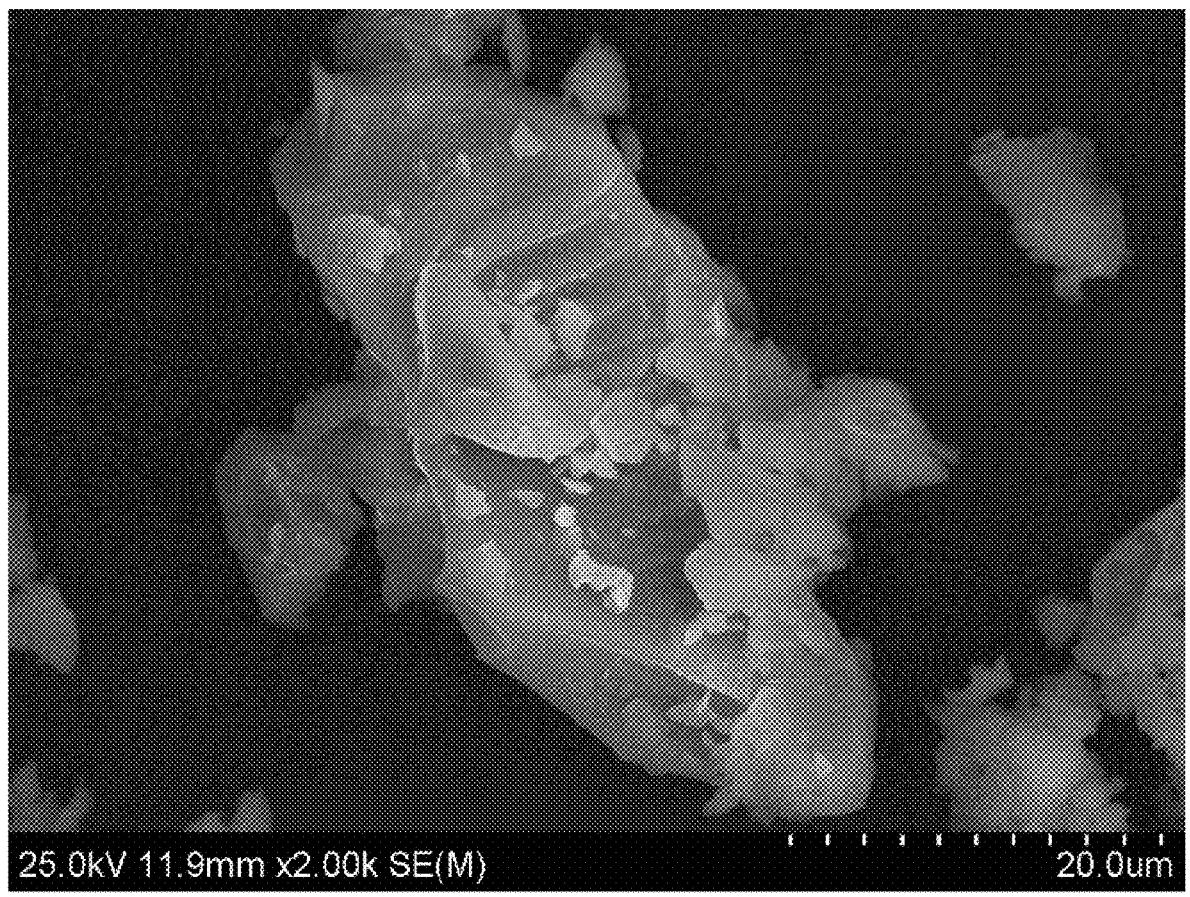
FIGS. 11A-11B: SEM of an example bioactive glass series containing copper, referred to as CY1, with (FIG. 11A) and without (FIG. 11B) a backscatter detector. No phase separation is seen.
Figure 11B:
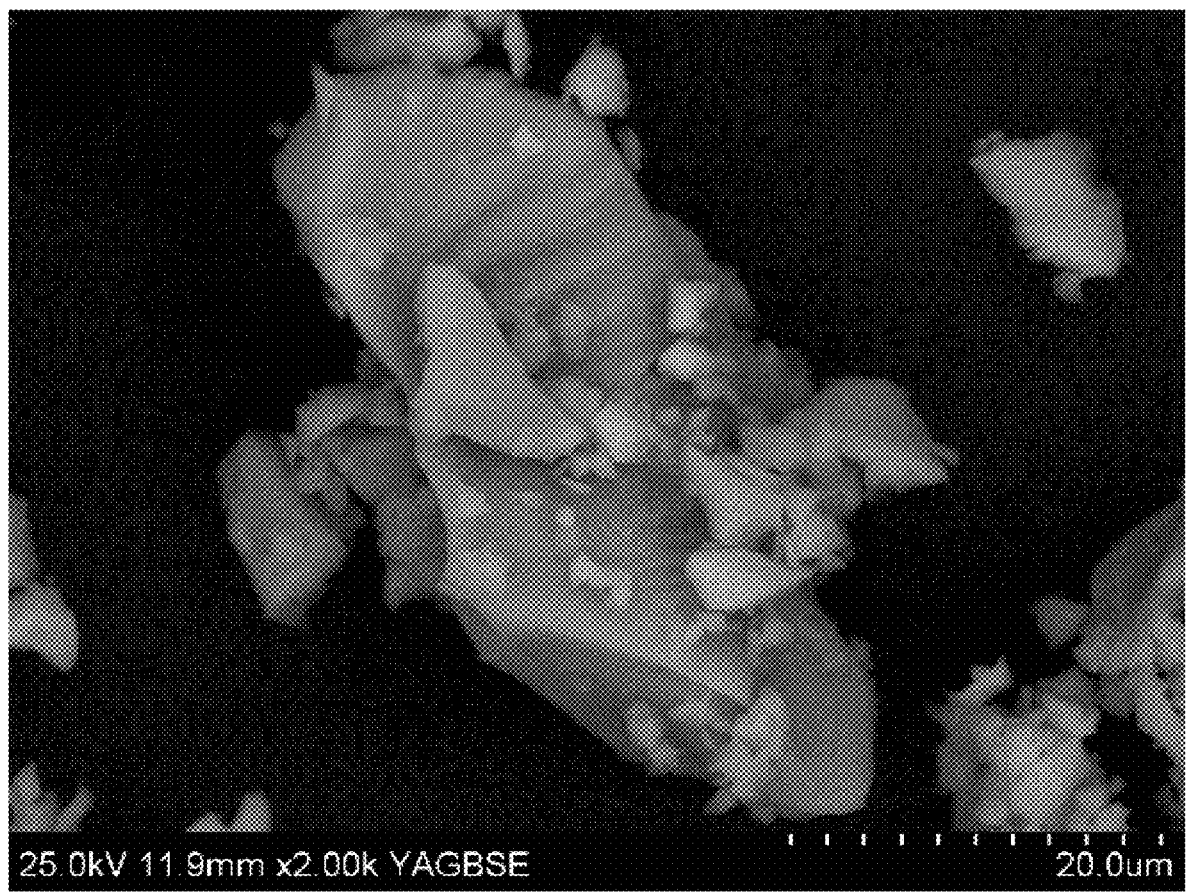
Figure 12A:
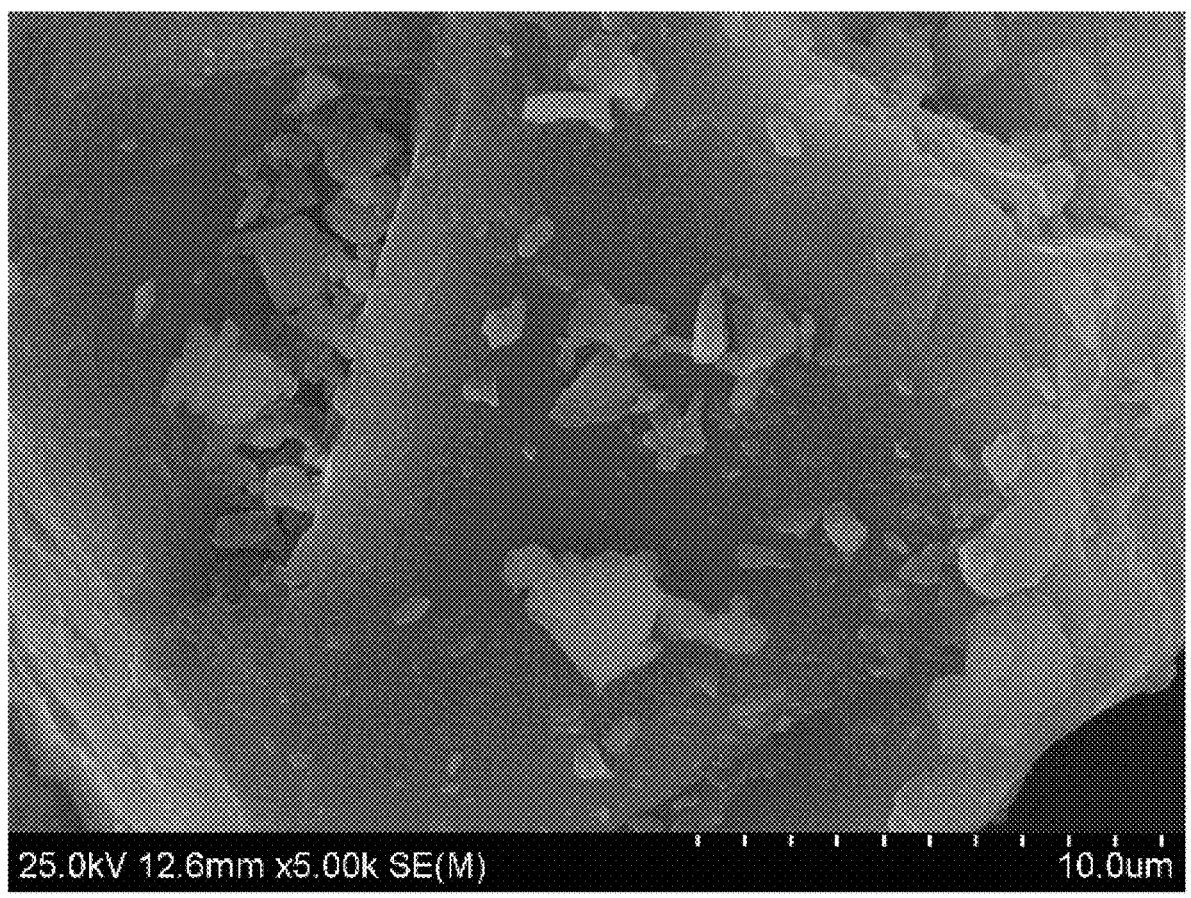
FIGS. 12A-12B: SEM of an example bioactive glass series containing copper, referred to as CY2, with (FIG. 12A) and without (FIG. 12B) a backscatter detector. No phase separation is seen.
Figure 12B:
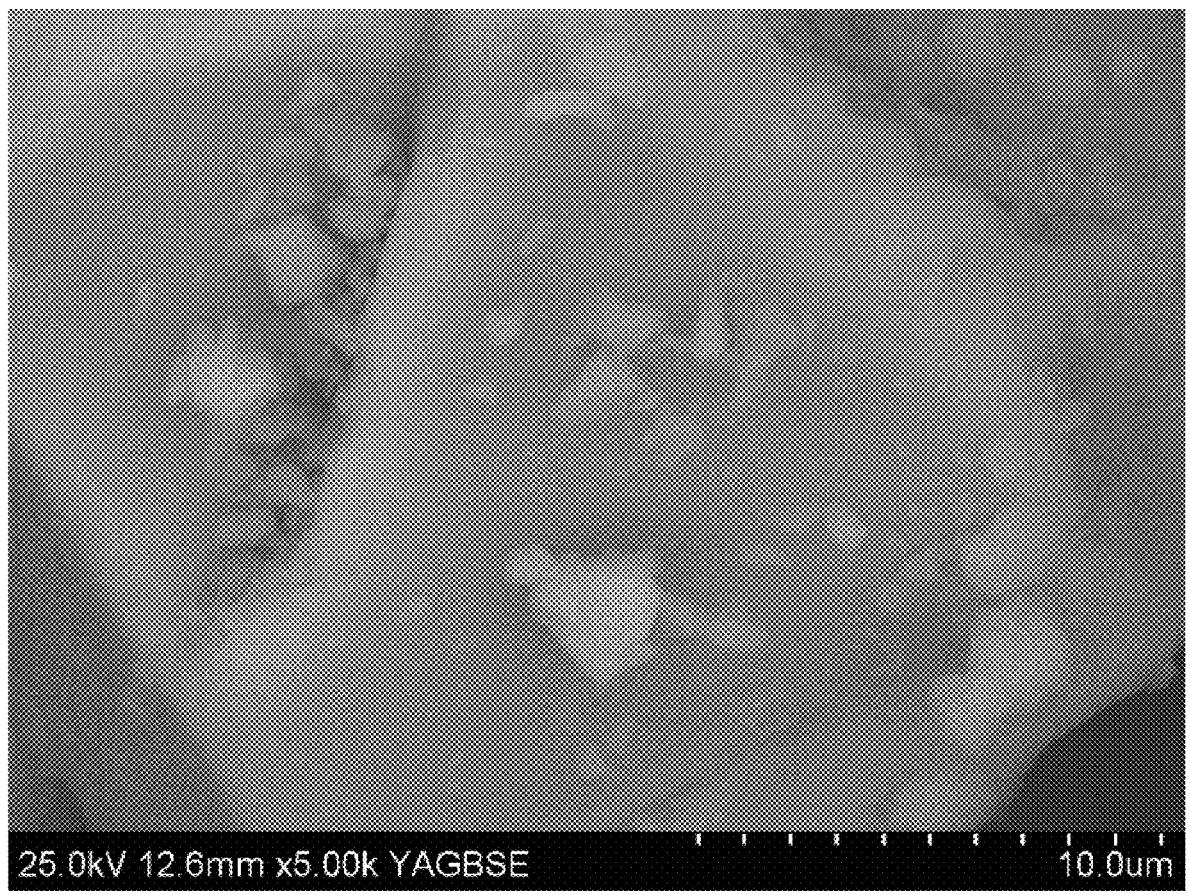
Figure 13A:
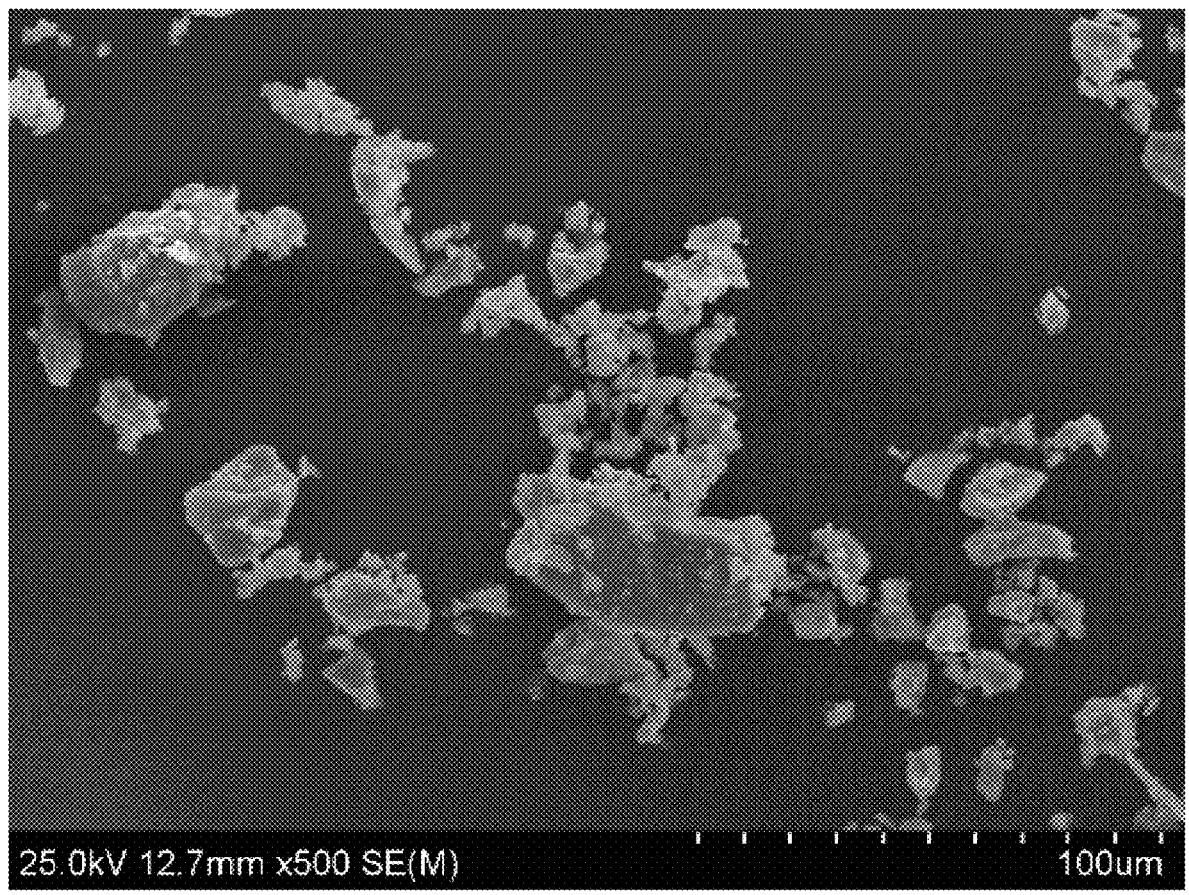
FIGS. 13A-13B: SEM of an example bioactive glass series containing copper, referred to as CY3, with (FIG. 13A) and without (FIG. 13B) a backscatter detector. No phase separation is seen.
Figure 13B:
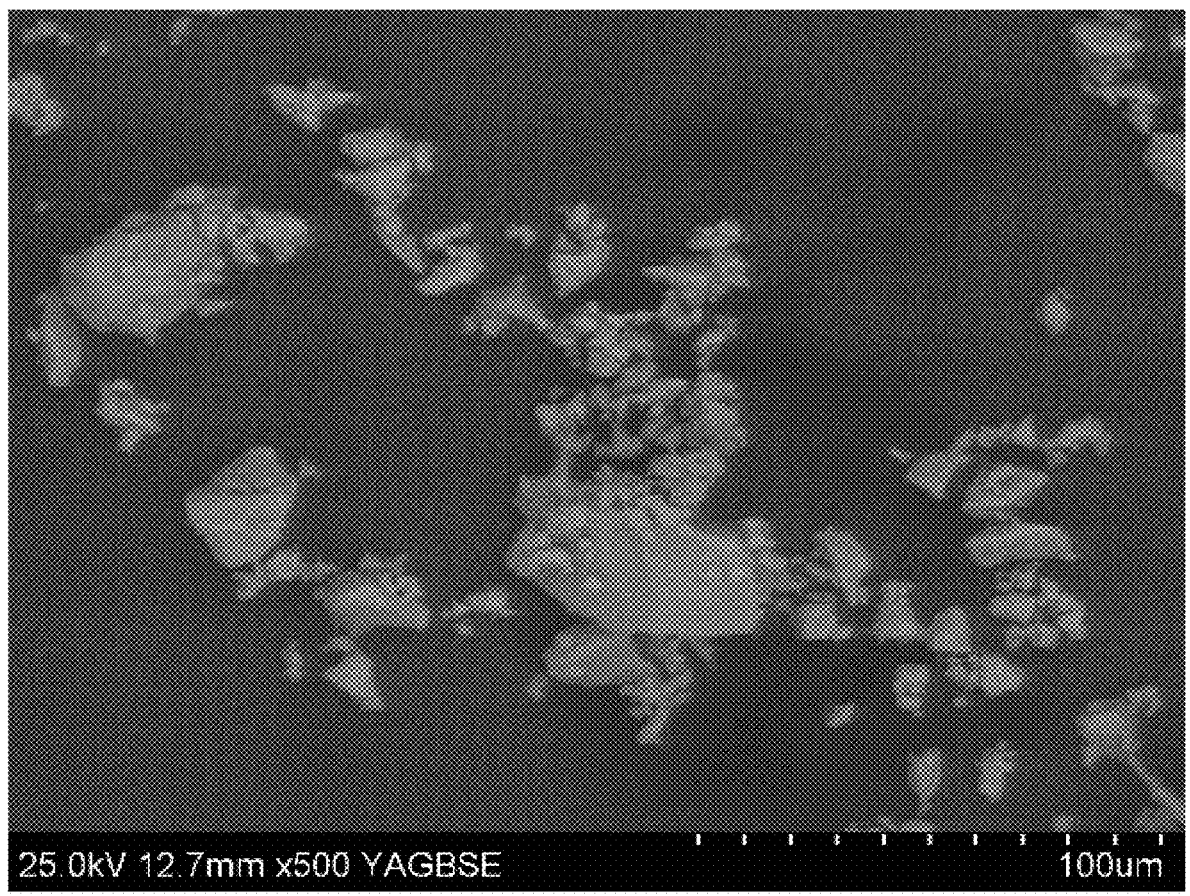

FIGS. 10A-10F show SEM images of the control. To rule out phase separation (which is when the copper or zinc could be coagulated, forming glassy areas of compositions different than the main glass body), a backscatter detector was used. If there were phase separation, there would be areas of distinctly different brightness in the images in FIGS. 10B, 10D, or 10F. No phase separation was seen at any magnification. In comparison, FIGS. 11A-11B show SEM images of CY1, FIGS. 12A-12B show SEM images of CY2, and FIGS. 13A-13B show SEM images of CY3. Again, no phase separation was seen at any magnification.

A differential thermal analysis was conducted. CY 3 N was run in nitrogen instead of air. No significant difference was observed as between CY 3 and CY 3 N.

Table 7 displays the glass transition temperatures measured for the glass series.

TABLE 7

| DTA analysis | |
|---|---|
| | $T_g$ (° C.) |
| CY con | 540.4 |
| CY 1 | 532.3 |
| CY 2 | 528.5 |
| CY 3 | 515.2 |

Figure 14:
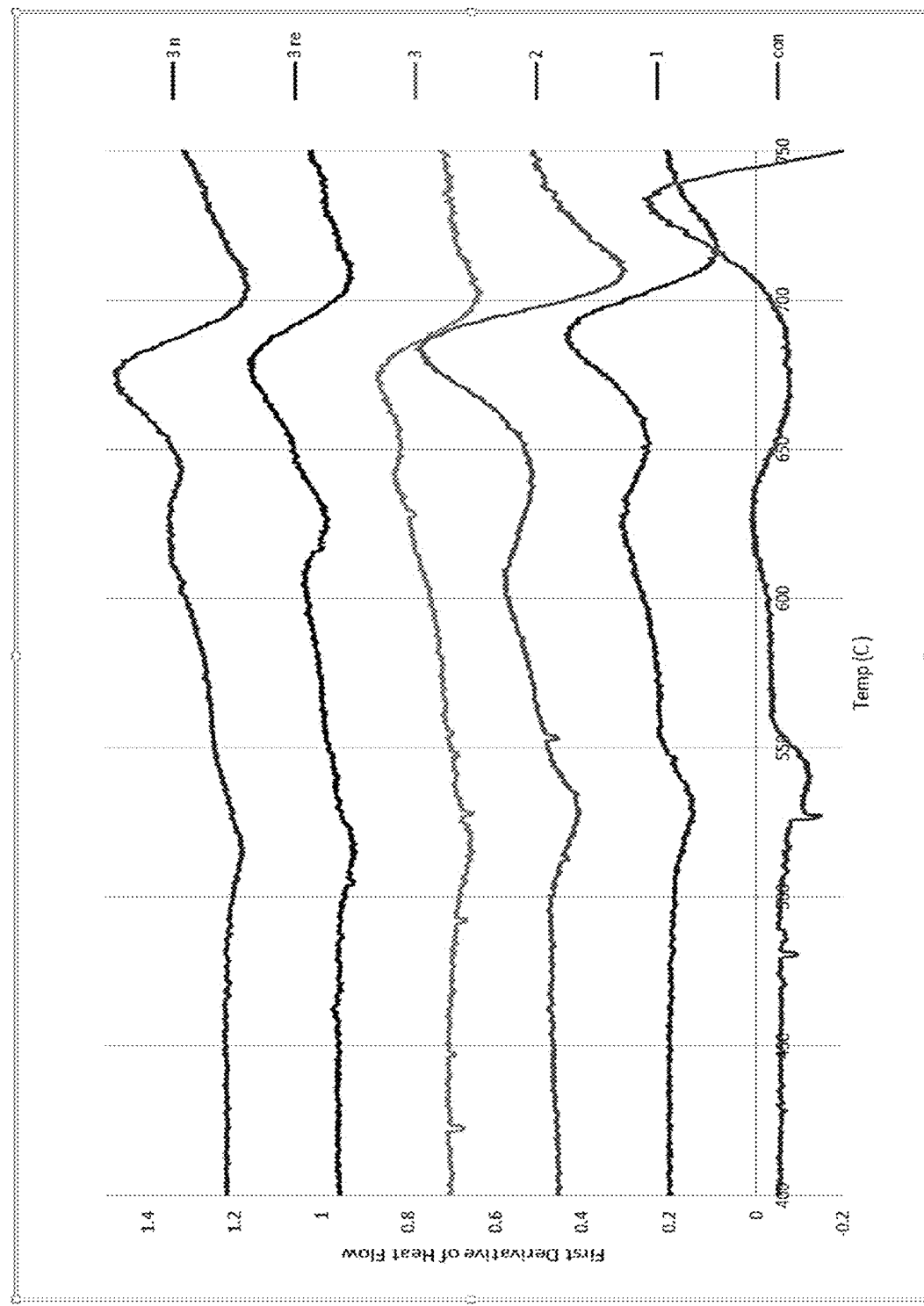
FIG. 14: Heat flow versus temperature of an example bioactive glass series containing copper.

FIG. 14 shows the plots of the first derivative of heat flow versus temperature of the glass series. The addition of copper decreased the glass transition of the glass. However, when run in an oxygen deficient environment, there was no difference from when it was run with oxygen. This indicates that the potential change in oxidative state seen in the color change does not affect the glass transition temperature.

Example III—3D Printable Filaments with Antibacterial Activity 3D printable filaments were produced with the KC 2 zinc glass described in Example I (having a zinc content of 10%). The zinc bioactive glass was mixed with PLA at a bioactive glass:polymer ratio of 2:3 by weight. The mixture was heated in an extrusion device and extruded to produce a 3D printable filament. The same process was also conducted with acrylonitrile butadiene styrene (ABS) instead of PLA to produce ABS-based 3D printable filaments with bioactive glass.

Figure 15A:
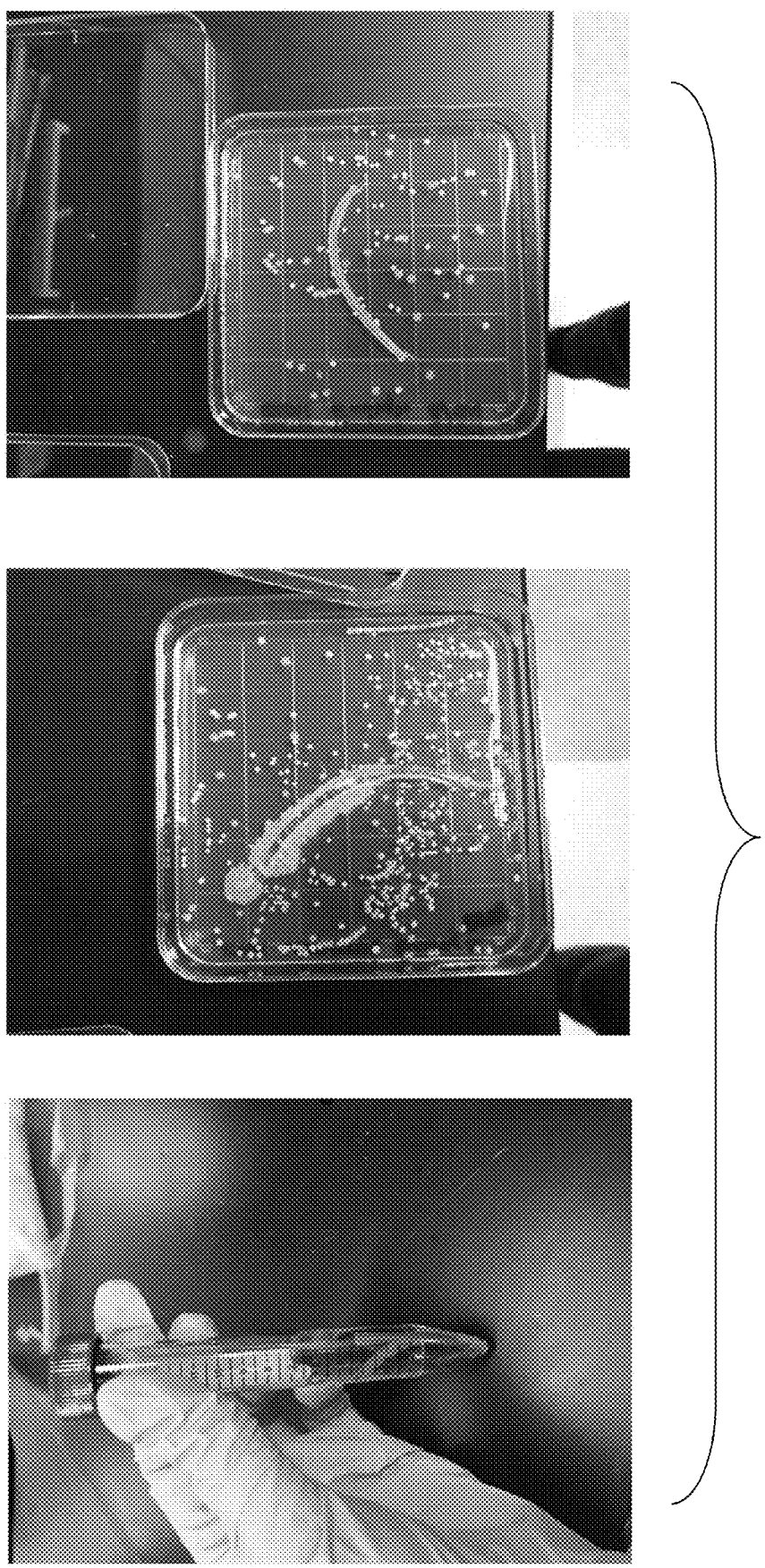
FIGS. 15A-15D: Photographs showing the inhibition of growth of bacteria by a 3D printable filament comprising zinc bioactive glass, 24 hours after exposure to *E. coli* (FIG. 15A), bacteria present on a kitchen countertop (FIG. 15B), bacteria present on a drinking fountain (FIG. 15C), and bacteria present on a bathroom sink (FIG. 15D). The image on the left in each figure shows the filaments being exposed to the bacteria, while the image in the center of each figure shows the control filament without bioactive glass 24 hours after exposure and the image on the right of each figure shows the filament comprising zinc bioactive glass 24 hours after exposure.
Figure 15B:
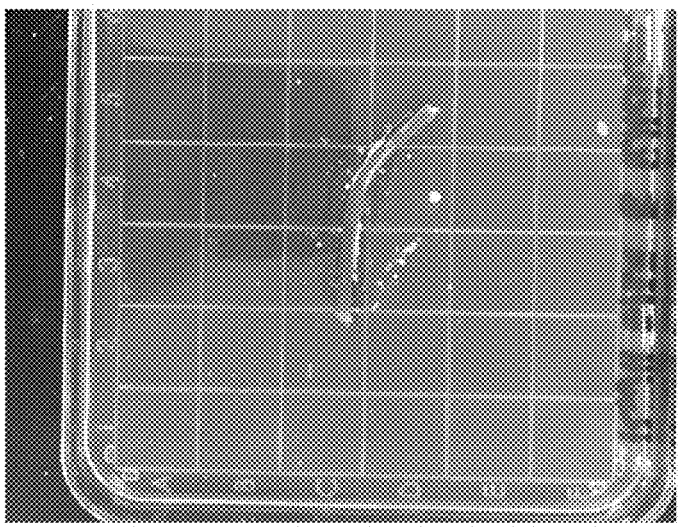
Figure 15B:
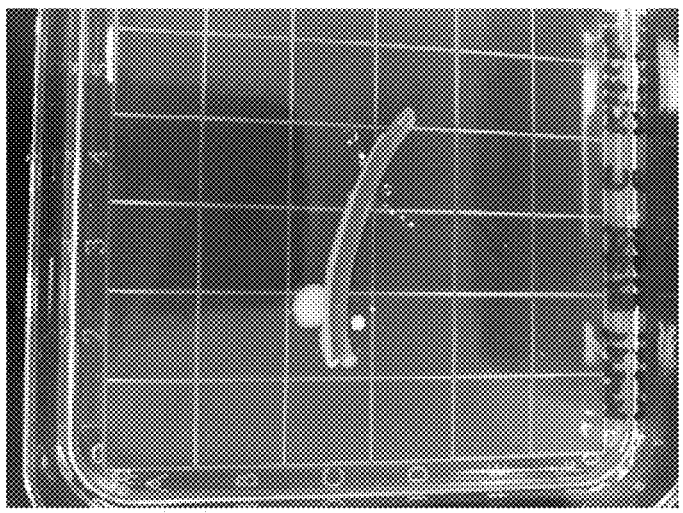
Figure 15B:
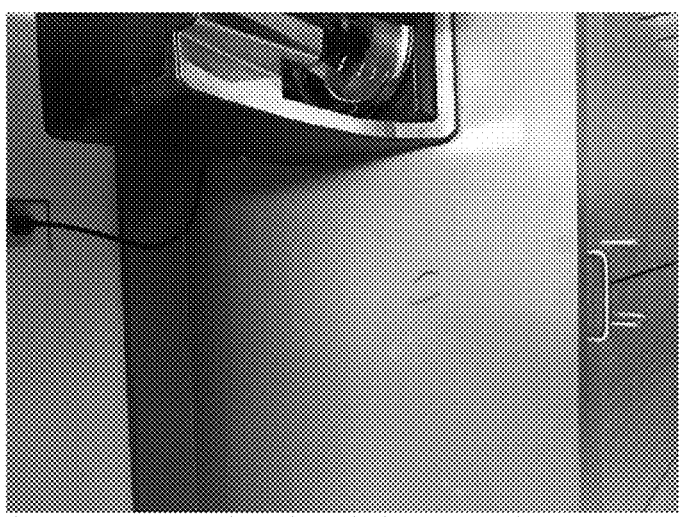
Figure 15C:
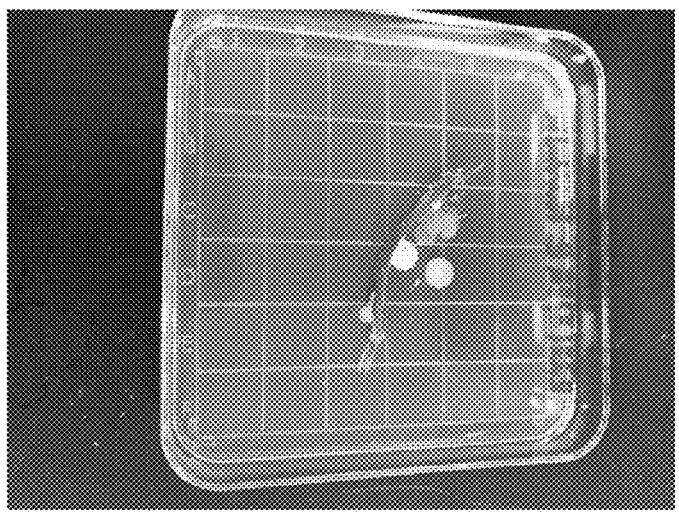
Figure 15C:
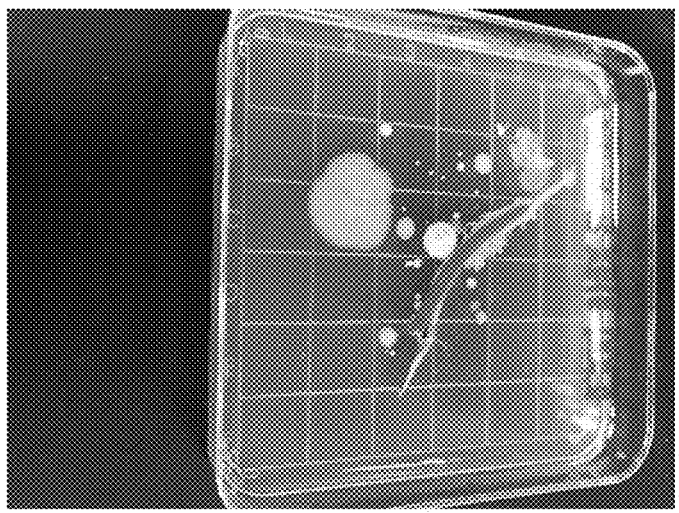
Figure 15C:
Figure 15D:
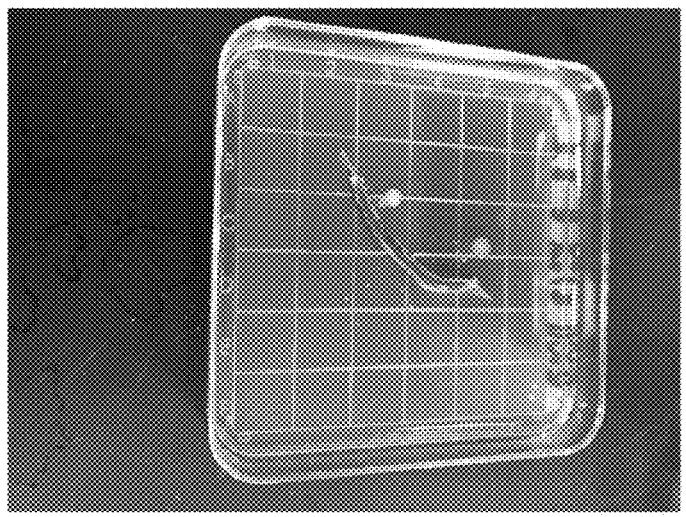
Figure 15D:
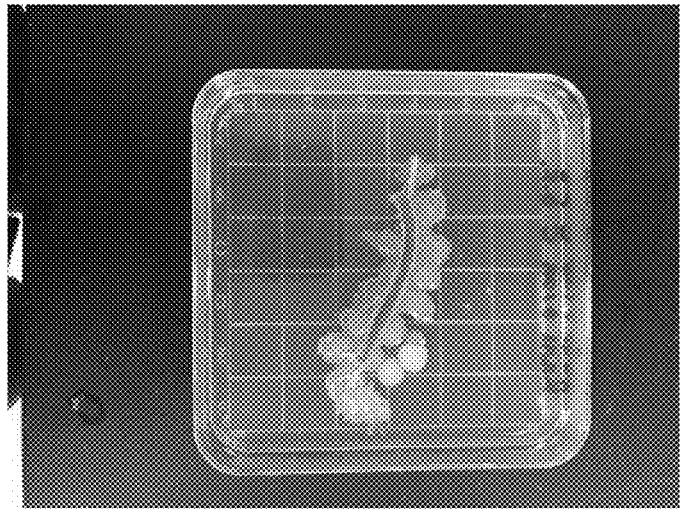
Figure 15D:
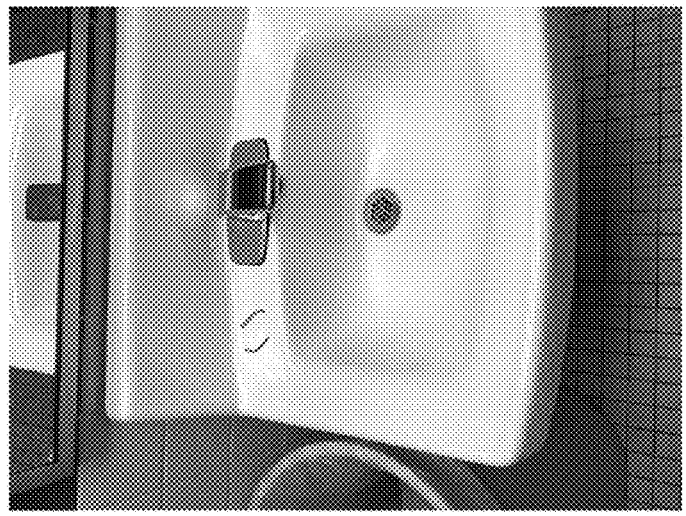

The antibacterial activity of the PLA-bioactive glass filament was tested by plating the filament and a control filament without bioactive glass for 24 hours following exposure to bacteria. FIGS. 15A-15D show these results, where the left image in each figure shows the exposure to bacteria, the red filament in FIGS. 15B-15D is the control filament without bioactive glass, and the green filament in FIGS. 15B-15D includes the bioactive glass at a 2:3 ratio of bioactive glass:polymer. FIG. 15A shows the filaments during and 24 hours after exposure to E. coli. For the E. coli test, clear filament was used instead of red and green. As seen in the right panel in FIG. 15A compared to the middle panel in FIG. 15A, the filament that included bioactive glass clearly inhibited the growth of bacterial compared to the filament which did not contain bioactive glass. FIG. 15B shows the filaments during and 24 hours after exposure to a kitchen surface. FIG. 15C shows the filaments during and 24 hours after exposure to bacteria on a drinking fountain. FIG. 15D shows the filaments during and 24 hours after exposure to a bathroom sink. In each case, the filament having bioactive glass clearly inhibited the growth of bacteria compared to the filament without bioactive glass, thus demonstrating the antibacterial activity of the 3D printable filament.

The PLA-bioactive glass 3D printable filaments, and pure PLA filaments, were 3D printed into various objects. The ideal parameters for printing the PLA-bioactive glass 3D printable filament varied slightly from printing of pure PLA. Specifically, it was found that the ideal the nozzle temperature for printing the filament was 225° C., whereas the ideal nozzle temperature for printing pure PLA was 220° C. The ideal bed temperature was 65° C., which was the same as for printing pure PLA. The ideal % infill overlap was 13%, compared to 15% for pure PLA, and the ideal % flow was 105%, compared to 100% for pure PLA.

Certain embodiments of the compositions and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A bioactive glass composition comprising:
   one or more elemental former components comprising an element of the group consisting of: Si, Ge, and B;
   one or more modifier components comprising an element of the group consisting of: Ca, Na, Mg, Sr, Cl, Co, Fe, Ba, Mo, and Cr, wherein the one or more modifier components comprises at least SrO; and
   one or more additive components comprising an element of the group consisting of: Ag, Au, Zn, K, P, Cu, Se, Ga, Ti, and V, wherein the one or more additive components comprises at least ZnO and $K_2O$;
   wherein the one or more elemental former components are present in a combined amount ranging from about 40 mol % to about 65 mol %, the one or more modifier components are present in a combined amount ranging from about 10 mol % to about 50 mol %, the one or more additive components is present in a combined amount ranging from about 10 mol % to about 40 mol %, and the ZnO is present in an amount ranging from about 10 mol % to about 15 mol %.

2. The bioactive glass composition of claim 1, wherein the one or more modifier components are present in a combined amount of from about 35 mol % to about 50 mol %.

3. The bioactive glass composition of claim 1, wherein the one or more additive components are present in a combined amount of up to about 30 mol %.

4. The bioactive glass composition of claim 1, comprising a plurality of additive components, wherein the plurality of additive components comprises Zn, K, and Cu.

5. The bioactive glass composition of claim 1, comprising Si, Na, Sr, K, Mg, and Zn.

6. The bioactive glass composition of claim 1, comprising $SiO_2$, $Na_2O$, SrO, $K_2O$, and ZnO.

7. The bioactive glass composition of claim 1, wherein the ZnO is present at an amount of 10 mol %.

8. The bioactive glass composition of claim 1, further comprising MgO.

9. The bioactive glass composition of claim 8, wherein the MgO is present in an amount ranging from about 1 mol % to about 30 mol %.

10. The bioactive glass composition of claim 1, wherein the modifier component comprising Na is $Na_2O$.

11. The bioactive glass composition of claim 10, wherein the $K_2O$ is present in an amount of about 5 mol %, and the $Na_2O$ is present in an amount of about 10 mol %.

12. The bioactive glass composition of claim 1, further comprising an additive selected from the group consisting of coloring agents, plasticizers, antioxidants, thermal stabilizers, UV stabilizers, flame retardants, lubricants, antistatic agents, foaming agents, antifogging agents, nucleating agents, antiblocking agents, slip agents, and radio-opaque agents.

13. The bioactive glass composition of claim 1, wherein the bioactive glass composition releases antibacterial ions.

14. The bioactive glass composition of claim 1, wherein the bioactive glass composition is in a polymer filament, and wherein the polymer filament comprises polylactic acid (PLA), polyglycolide (PGA), acrylonitrile butadiene styrene (ABS), polypropylene (PP), polyethylene (PE), polyether ether ketone (PEEK), high impact polystyrene (HIPS), ethylene vinyl acetate (EVA), rubber, nylon, thermoplastic polyolefin (TPO), or a blend thereof.

15. The bioactive glass composition of claim 1, wherein the bioactive glass composition is in the form of glass fibers or glass powders.

16. A composite comprising a polymer having bioactive glass particles or fibers of claim 15 incorporated therein.

17. The composite of claim 16, wherein the bioactive glass particles or fibers comprise $SiO_2$, $Na_2O$, SrO, $K_2O$, MgO, and ZnO.

18. The composite of claim 16, wherein the composite releases ions and exhibits antibacterial activity.

19. The composite of claim 16, wherein the composite is formed into packaging for food or medical devices, wherein the packaging has antibacterial properties.

* * * * *